US006715460B2

(12) United States Patent  
Ashida et al.

(10) Patent No.: US 6,715,460 B2
(45) Date of Patent: Apr. 6, 2004

(54) LUBRICATION SYSTEM FOR SNOWMOBILE ENGINE

(75) Inventors: Takashi Ashida, Shizuoka (JP); Mamoru Atsuumi, Shizuoka (JP)

(73) Assignee: Yamaha Hatsudoki Kabushiki Kaisha (JP)

(*) Notice: Subject to any disclaimer, the term of this patent is extended or adjusted under 35 U.S.C. 154(b) by 0 days.

(21) Appl. No.: 10/100,554

(22) Filed: Mar. 14, 2002

(65) Prior Publication Data

US 2002/0148662 A1 Oct. 17, 2002

(30) Foreign Application Priority Data

Mar. 14, 2001 (JP) ......................................... 2001-072806

(51) Int. Cl.[7] ................................................. F02F 7/00
(52) U.S. Cl. .............................. 123/196 R; 123/196 A; 123/198 C
(58) Field of Search ........................ 123/196 R, 196 A, 123/198 R, 198 C

(56) References Cited

U.S. PATENT DOCUMENTS

| | | |
|---|---|---|
| 4,334,508 A | 6/1982 | Sasaki |
| 4,611,559 A | 9/1986 | Sumigawa |
| 4,787,832 A | 11/1988 | Fukasawa et al. |
| 4,993,374 A | 2/1991 | Okui |
| 5,024,088 A | 6/1991 | Komatsu et al. |
| 5,113,807 A | 5/1992 | Kobayashi |
| 5,372,215 A | 12/1994 | Fukuda |
| 5,647,315 A | 7/1997 | Saito |
| 5,701,872 A | 12/1997 | Kaku et al. |
| 5,839,930 A | 11/1998 | Nanami et al. |
| 5,860,402 A | 1/1999 | Sakurai et al. |
| 5,876,188 A | 3/1999 | Okamoto |
| 5,899,779 A | 5/1999 | Hattori |
| 5,984,742 A | 11/1999 | Kimura et al. |
| 6,024,193 A | 2/2000 | Fukushima |

Primary Examiner—Henry C. Yuen
Assistant Examiner—Jason Benton
(74) Attorney, Agent, or Firm—Knobbe, Martens, Olson & Bear, LLP

(57) ABSTRACT

A snowmobile has an internal combustion engine that includes a lubrication system. The lubrication system includes a lubricant pump unit mounted in a crankcase chamber of the engine, a lubricant cooler, and a lubricant filter. The lubricant pump unit is mounted at a location offset from an axis about which the crankshaft rotates. The lubricant pump unit also has a lubricant pump that is rotatable about a lubricant pump axis. At least one of the lubricant cooler and the lubricant filter is positioned on the same side of the engine as the lubricant pump unit.

33 Claims, 17 Drawing Sheets

LUBRICATION SYSTEM FOR SNOWMOBILE ENGINE

RELATED APPLICATIONS

This application is based upon and claims the priority of Japanese Patent Application No. 2001-072806, filed on Mar. 14, 2001, which is hereby incorporated by reference in its entirety.

BACKGROUND OF THE INVENTION

1. Field of the Invention

The present invention generally relates to an improved engine for land vehicles. More specifically, the present invention relates to an improved lubrication system layout for an engine that results in a generally smaller engine, and thus a generally smaller vehicle body.

2. Description of the Related Art

Snowmobiles are powered by internal combustion engines that are mounted within a substantially enclosed engine compartment forward of the rider's seat. The engine compartment typically is defined within a cowling and is generally relatively small.

Internal combustion engines generally have a lubrication system to reduce friction between moving components, which causes heat and wear of the moving components of the engine. The lubrication system sometimes includes a lubricant pump for supplying lubricant to the various moving components, a lubricant cooler for removing heat from the lubricant, and a lubricant filter for removing debris from the lubricant. Typically, the lubricant pump is mounted on the opposite side of the engine from the lubricant cooler and the lubricant filter.

Positioning the lubricant filter and the lubricant cooler on the opposite side of the engine from the lubricant pump is disadvantageous for snowmobile applications because it increases the distance between these components, which increases the size of the engine. Also, a more complex system of conduits is required to route the lubricant to these components and to the moving engine components.

SUMMARY OF THE INVENTION

Thus, an engine layout that can reduce the engine size and reduce the complexity of the lubrication system is desired.

Accordingly, one aspect of the present invention involves a snowmobile that has a frame assembly that defines a longitudinal vertical plane and a transverse vertical plane. An internal combustion engine is mounted to the frame assembly generally along the transverse vertical plane of the frame assembly. The internal combustion engine includes a cylinder block that defines a cylinder bore and a crankcase connected to the cylinder block. The crankcase defines a crankcase chamber. The crankcase has a crankshaft journaled therein that rotates about a crankshaft axis. The engine also has a piston reciprocally positioned in the cylinder bore that drives the crankshaft. The engine also has a lubrication system that includes a lubricant pump unit mounted in the crankcase chamber, a lubricant cooler, and a lubricant filter. The lubricant pump unit is mounted at a location offset from the crankshaft axis. The lubricant pump unit also has a lubricant pump that is rotatable about a lubricant pump axis. At least one of the lubricant cooler and the lubricant filter is positioned on the same side of the engine as the lubricant pump unit.

Another aspect of the present invention involves an internal combustion engine that includes a crankcase and a cylinder block that defines a cylinder bore. The crankcase is connected to the cylinder block and defines a crankcase chamber. A crankshaft is journaled in the crankcase and is rotatable about a crankshaft axis. A piston that is reciprocally positioned in the cylinder bore drives the crankshaft. The engine also has a lubrication system that includes a lubricant cooler, a lubricant filter, and a lubricant pump unit. The lubricant pump unit is mounted in the crankcase chamber at a location offset from the crankshaft axis. The lubricant pump unit includes a lubricant pump that is rotatable about a lubricant pump axis. At least one of the lubricant cooler and the lubricant filter is positioned on the same side of the engine as the lubricant pump unit.

BRIEF DESCRIPTION OF THE DRAWINGS

These and other features, aspects and advantages of the present invention will be better understood with reference a preferred embodiment, which is illustrated in the accompanying drawings. The illustrated embodiment is merely exemplary and is not intended to define the outer limits of the scope of the present invention. The drawings of the illustrated arrangement comprise seventeen figures.

DETAILED DESCRIPTION OF THE PREFERRED EMBODIMENT

Figure 1:
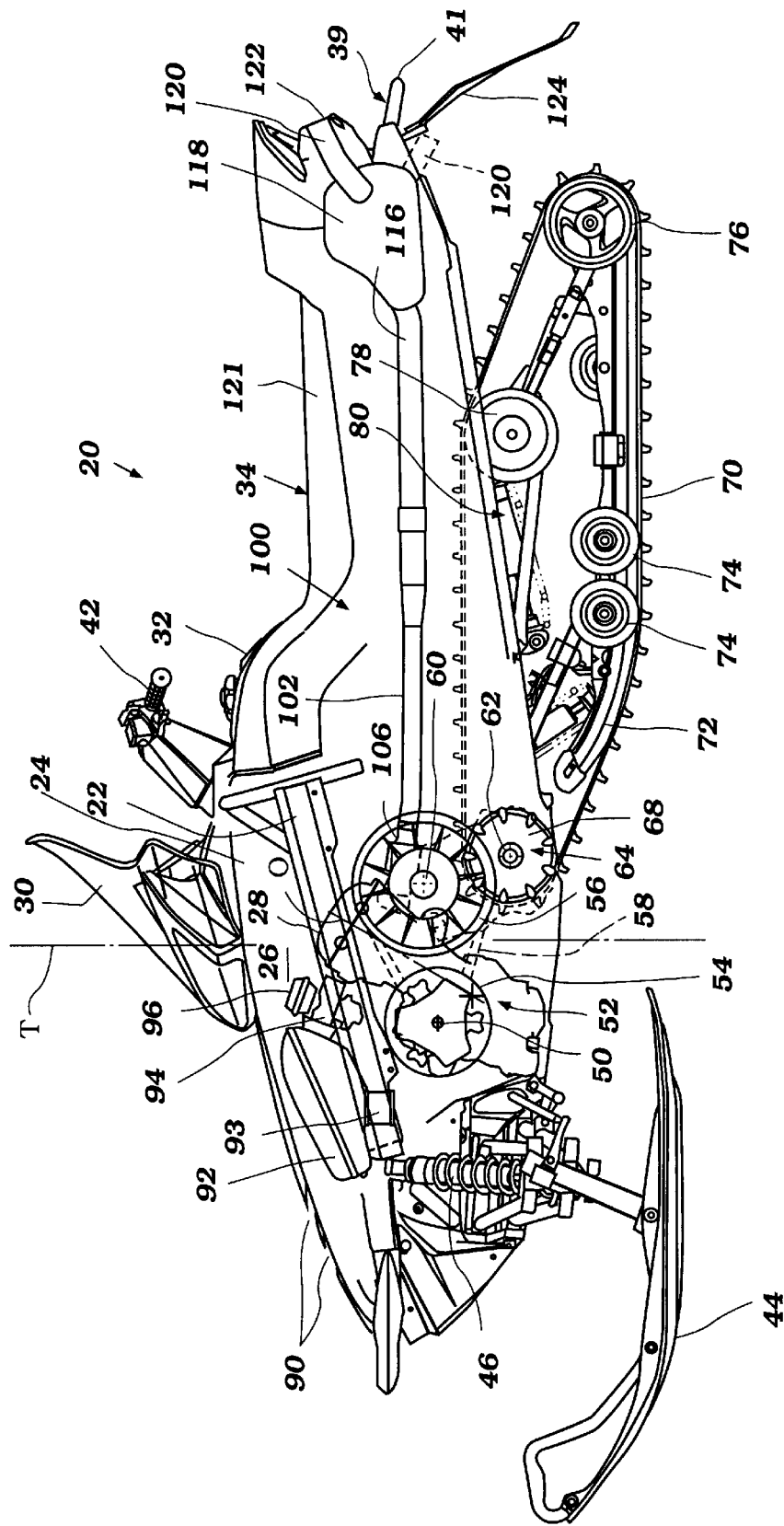
FIG. 1 is a side elevation view of a one embodiment of a snowmobile with certain portions broken away and other internal portions shown in hidden line to better illustrate certain features, aspects and advantages of the present invention.

With reference now to FIG. 1, a snowmobile featuring certain features, aspects and advantages of the present invention will be described. The snowmobile, indicated generally by the reference numeral 20, is an environment for which many features, aspects and advantages of the present invention have been specially adapted. Nevertheless, certain features, aspects and advantages of the present invention can be used with other vehicles, such as all-terrain vehicle and watercraft.

The snowmobile 20 generally comprises a frame assembly 22 that carries a number of other components of the snowmobile 20. A forward body cover 24 is disposed over a forward portion of the frame assembly 22. The forward body cover 24 defines, in part, an engine compartment 26 in which an engine 28 is mounted. The engine 28 is mounted to the frame assembly 22 in any suitable manner. The engine 28 and its associated systems and components will be described in greater detail below in connection with FIGS. 2–17.

A windshield 30 is disposed over a mid-portion of the body cover 24. The windshield 30 provides some degree of protection for the riders from wind and other elements during operation of the snowmobile 20. Rearward of the windshield 30, a fuel tank 32 is mounted to the frame assembly 22 in a manner that allows the body cover 24 and the fuel tank 32 to blend together for aesthetic reasons.

Rearward of the fuel tank 32, a seat 34 is mounted to the frame assembly 22. A right-side step, or foot-rest 36, is attached to the right-hand side of the frame 22 of the snowmobile 20. A left-side step, or foot-rest 38, is attached to the left-hand side of the frame 22 of the snowmobile 20. As used herein, "right," "right-hand," "right-side," "left," "left-hand," and "left-side" are defined from the perspective of a rider on the seat 34 facing forward. Rearward of the seat 34 is positioned a grab bar 39 that comprises a grabbing portion 41 that can be used to raise a rear portion of the snowmobile for turning and maneuvering when the snowmobile is not being ridden. While the illustrated grab bar 39 is generally U-shaped and is mounted in a generally horizontal manner, other forms of grab bars can be used. For instance, the grab bar 39 can be loops, semicircular, vertical or inclined in orientation. In short, any suitable grab bar construction can be used.

Forward of the seat 34 and the fuel tank 32 is a steering handle assembly 42. The handle assembly 42 can carry appropriate controls and can be coupled to a pair of front skis 44 in any suitable manner. Manipulation of the handle assembly 42 causes the direction of the snowmobile 20 to be altered in a known fashion. The skis 44 are mounted to the frame assembly 22 though a front suspension assembly 46. Any suitable front suspension assembly 46 can be used.

The engine 28 in the illustrated arrangement is an inclined L-4 four-cycle engine that is mounted transversely within the engine compartment 26. In other words, the illustrated engine 28 comprises four cylinder bores that extend side-by-side across a width of the snowmobile 20. The cylinder bores each comprise a center axis O that is inclined relative to vertical. In some arrangements, engines having differing numbers of cylinder bores, different cylinder bore configurations (e.g., V, opposing, etc.), different orientations (e.g., vertical) and different operating principles (e.g., two-stroke, rotary, etc.) can be used.

The engine 28 also comprises an output shaft 50. The output shaft 50 drives a transmission, which is a continuously variable transmission 52 in the illustrated arrangement. Other transmissions also can be used. In the illustrated arrangement, the output shaft 50 rotates a drive pulley 54. The output shaft 50 and the drive pulley 54 can be connected together through a clutch, a centrifugal clutch, a sprag clutch or can be directly connected together.

The drive pulley 54 powers a driven pulley 56 with a v-belt 58 in the illustrated arrangement. In some configurations, a drive chain can be used in place of the v-belt 58. Other arrangements also can be used. The driven pulley 56 is connected to and rotates about a transfer shaft 60. In the illustrated arrangement, the transfer shaft 60 carries a sprocket (not shown) at the end opposite to the driven pulley 56. The sprocket is connected to a further sprocket that is carried by a drive shaft 62.

The drive shaft 62 powers a drive unit 64. The drive unit 64 generally comprises a plurality of drive wheels 68. The drive wheels 68 provide a motive force to a drive belt 70, which is commonly used in the snowmobile industry.

With continued reference to FIG. 1, the drive belt 70 is guided around a preferred path on a pair of slide rails 72, a plurality of suspension wheels 74 and main rear suspension wheels 76. The slide rails 72 preferably support the suspension wheels 74 and the main rear suspension wheels 76. An idler roller 78 preferably is mounted to the frame assembly 22 and helps to define the preferred path for the drive belt 70. As is known in the snowmobile industry, these components can be mounted to the frame assembly with a rear suspension system 80. Any suitable rear suspension system 80 can be used and certain portions of the rear suspension system 80 have been schematically illustrated in the illustrated arrangement.

Many of the above-described components are generally conventional and can be arranged and configured in any suitable manner. Additionally, the above-described components can be replaced by other suitable components where desired. Any details omitted to this point have been considered well within the design knowledge of those of ordinary skill in the art.

With continued reference to FIG. 1, air is drawn into the engine compartment 26 through suitable air passages. In some arrangements, the air is drawn through ventilation openings 90 formed in the body cover 24. The air drawn or forced into the engine compartment 26 circulates about the engine 28 and related drive components to help cool the engine 28 and the related drive components.

The air also is drawn into an air induction system that includes an air intake box 92. The air intake box 92 is disposed forward of the engine 28 in the illustrated arrangement. The air intake box 92 can be mounted to the frame assembly 22 in a manner that will be described. An air inlet 93 into the air intake box 92 can extend upward into a lower surface of the air intake box 92.

A set of intake runners 94 extends between the illustrated air intake box 92 and the engine 28. Preferably, a charge former 96 is disposed along each of the intake runners 94. Advantageously, the intake runners 94 extend directly rearward to the engine 28 rather than wrapping around the engine 28 and mating with a rearward-facing surface of the engine 28. The charge formers 96 preferably correspond to each cylinder bore. In some arrangements, a single charge former can be used upstream of a separation point for runners extending to individual cylinder bores. In addition, in the illustrated arrangement, the engine 28 is carbureted. In some arrangements, the charge formers 96 can be fuel injectors that are mounted for direct injection, indirect injection or port injection. The air-fuel charge provided in this manner is combusted within the engine as discussed in more detail below.

The combustion byproducts then are exhausted through a suitable exhaust system 100. In the illustrated arrangement, the exhaust system 100 extends directly rearward from the engine 28. In this manner, an exhaust runner 102 that extends rearward from the engine can be tuned to the engine for improved engine performance. Additionally, the length of each runner 102 can be lengthened prior to merging together with any other runners such that pulse effects on adjoining cylinder bores can be reduced. In some arrangements, an attenuation chamber or passage between two or more runners can be used to reduce the effect of reflected pressure pulses in the exhaust system.

With continued reference to FIG. 1, the exhaust system 100 preferably comprises the exhaust runners 102 that correspond to each cylinder bore and that extend generally rearward from the engine. Each exhaust runner 102 is coupled to an exhaust discharge pipe 106 that is joined to the engine. In some arrangements, a single manifold can be used while in others each of the exhaust discharge pipes 106 are individually joined to the engine. At least two of the runners 102 join at a merge location (not shown) and the merged flow passes through a manifold pipe 116.

The manifold pipes 116 extend rearward to a silencer box 118. The silencer box 118 provides an enlarged volume into which the exhaust can flow. Exhaust energy is dissipated within the silencer box 118 and the noise level of the exhaust can be decreased. In the illustrated arrangement, the silencer box 118 is disposed below a portion of the seat 34 that is rearward of a rider section 121 of the seat.

A pair of exhaust pipes 120 extends rearward from the silencer box 118. In some arrangements, a single exhaust pipe 120 can extend from the silencer box 118. Other numbers of exhaust pipes also can be used. One end of each of the exhaust pipes 120 preferably defines an ultimate exhaust discharge 122 from the snowmobile 20 such that the exhaust gases are discharged into the atmosphere at this location. As illustrated in FIG. 1, the exhaust pipes 120 can extend upwardly and rearwardly from the silencer box 118 while, in another arrangement, shown in hidden lines, the exhaust pipes 120 can extend downward to a location forward of a protective flap 124. Preferably, the exhaust pipes 120 terminate at a location forward of the grab portion 41 of the grab bar 39.

With reference now to FIGS. 2–17, the engine 28 and some systems and components thereof will be described in greater detail. The engine 28 includes a cylinder block 204 that defines four combustion bores 208 spaced from each other transversely across the snowmobile 20. As mentioned above, each of the cylinder bores 208 has a cylinder bore axis O that is slanted or inclined at an angle from an imaginary vertically-oriented plane T that is transverse to the snowmobile 20 so that the engine 28 can be shorter in height (see FIG. 1). The cylinder bore axis O is the same for each of the cylinder bores 208 in the illustrated embodiment. A pistons 212 reciprocate within each of the cylinder bores 208.

A cylinder head 216 is affixed to the upper end of the cylinder block 204 to close respective upper ends of the cylinder bores 208 and thus define combustion chambers 220 with the cylinder bores 208 and the pistons 212. The cylinder head 216 defines intake ports 254 that communicate with the associated combustion chambers 220 and also communication with the air induction system discussed above. The cylinder head 216 also defines exhaust ports 266 that communicate with the associated combustion chambers 220 and also communicate with the exhaust system 100 discussed above. The ports 254, 266 and their function in controlling the introduction and withdrawal of gasses from the combustion chambers 20 will be discussed in more detail below.

Figure 2:
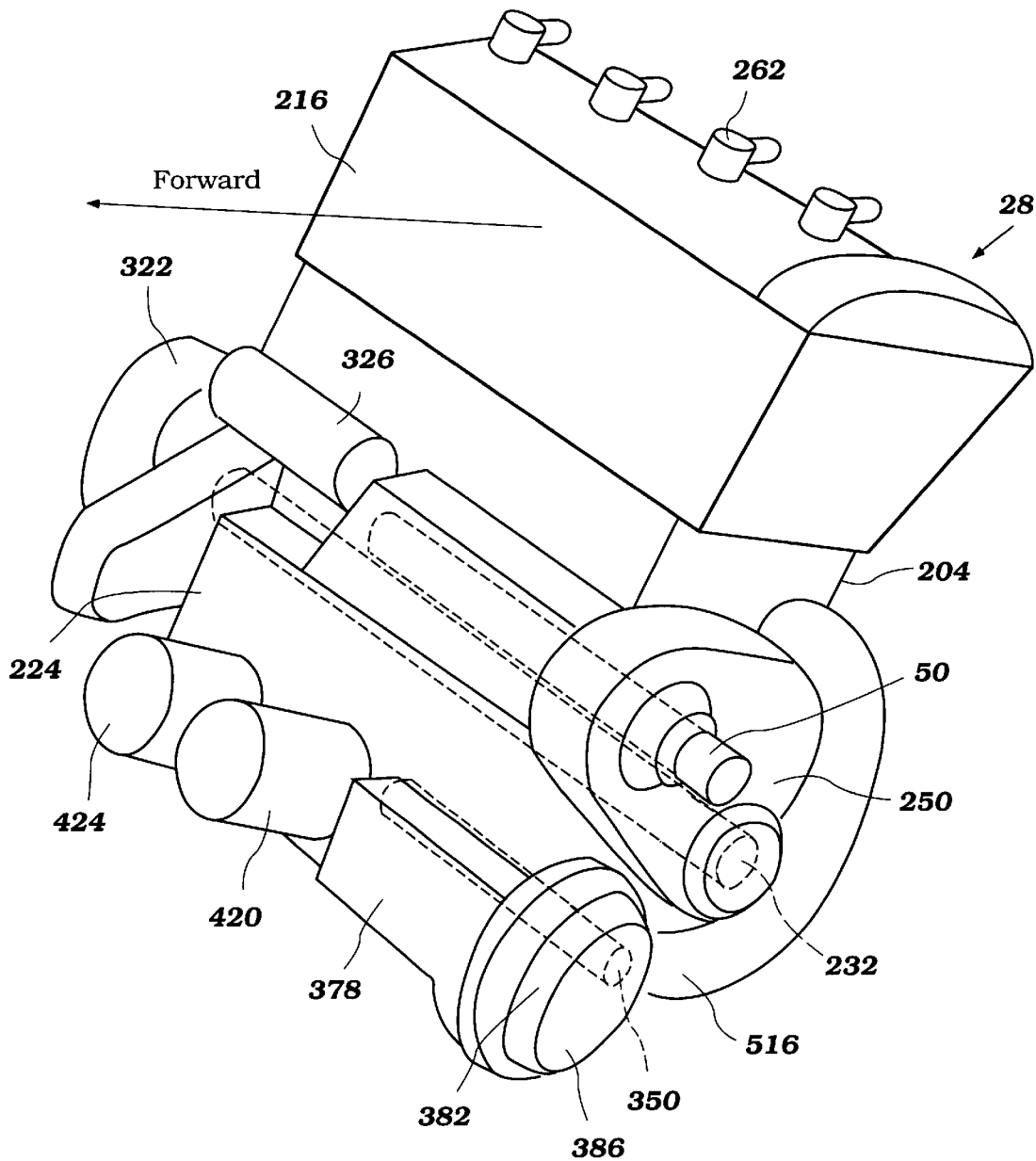
FIG. 2 is a schematic top, front, and side perspective view of one embodiment of an engine of the snowmobile of FIG. 1.
Figure 6:
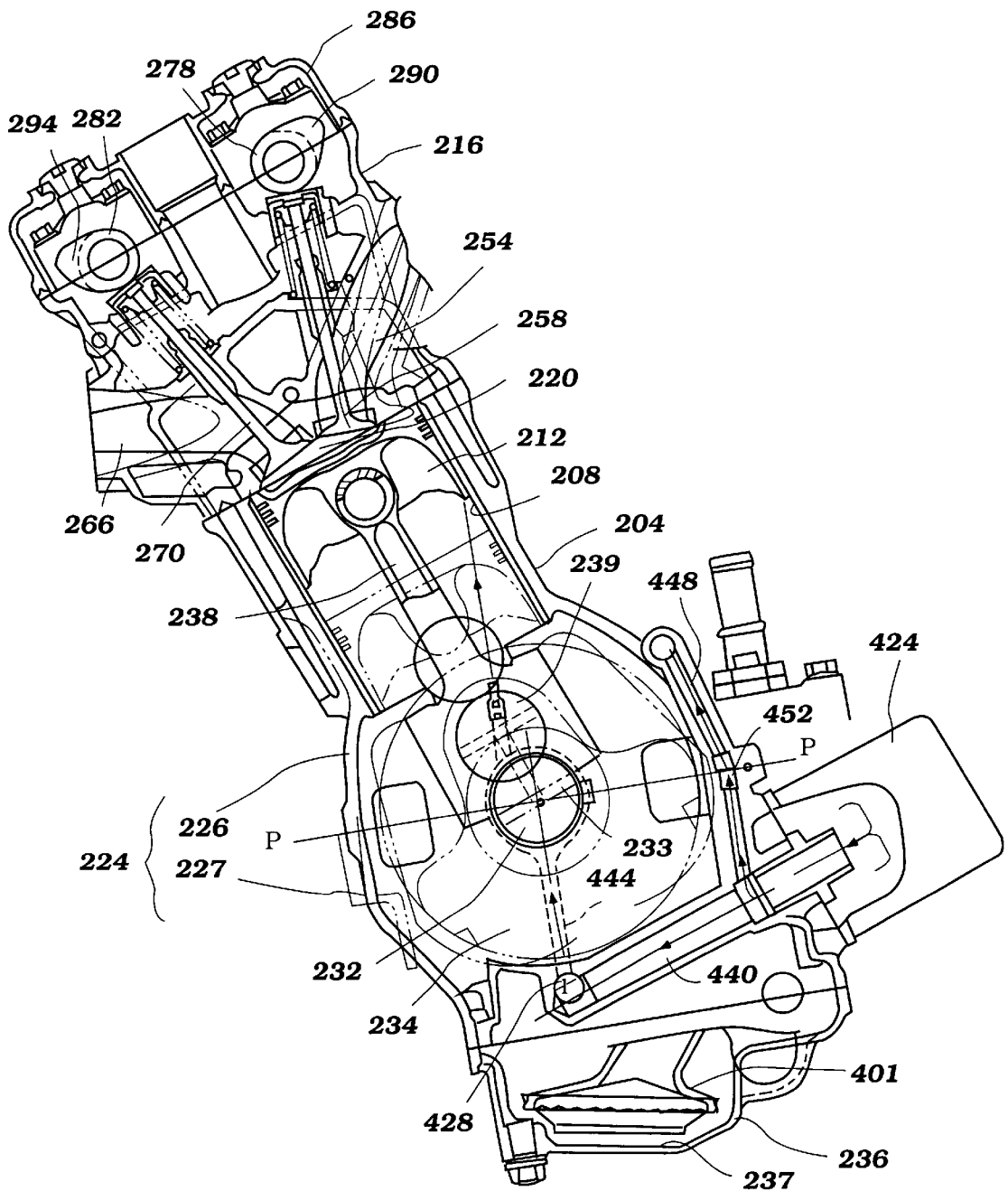
FIG. 6 is a cross-section view of the engine of FIG. 2 taken along the line 6—6 shown in FIG. 7.
Figure 7:
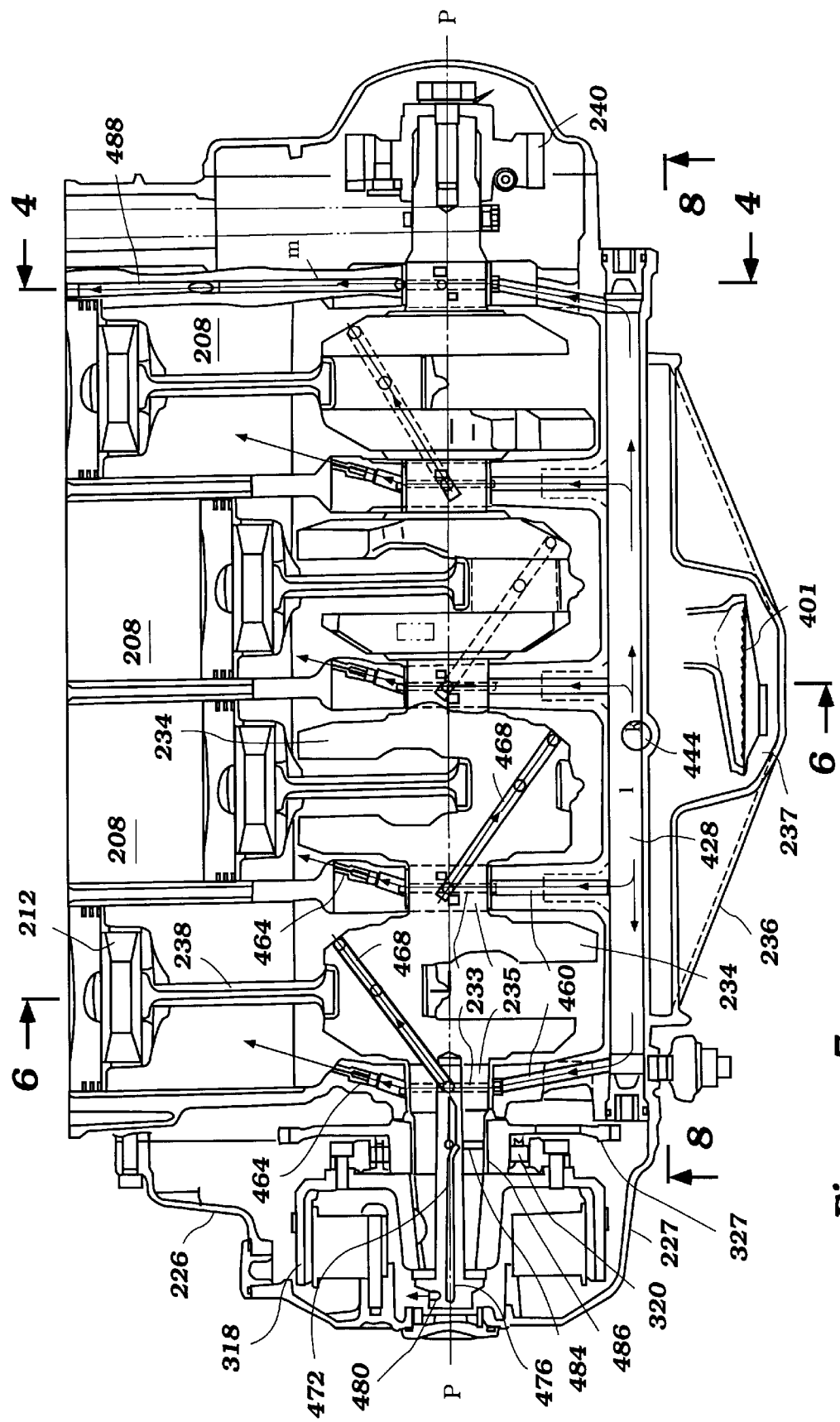
FIG. 7 is a cross-section view of the engine of FIG. 2 taken along the line 7—7 shown in FIG. 4.
Figure 8:
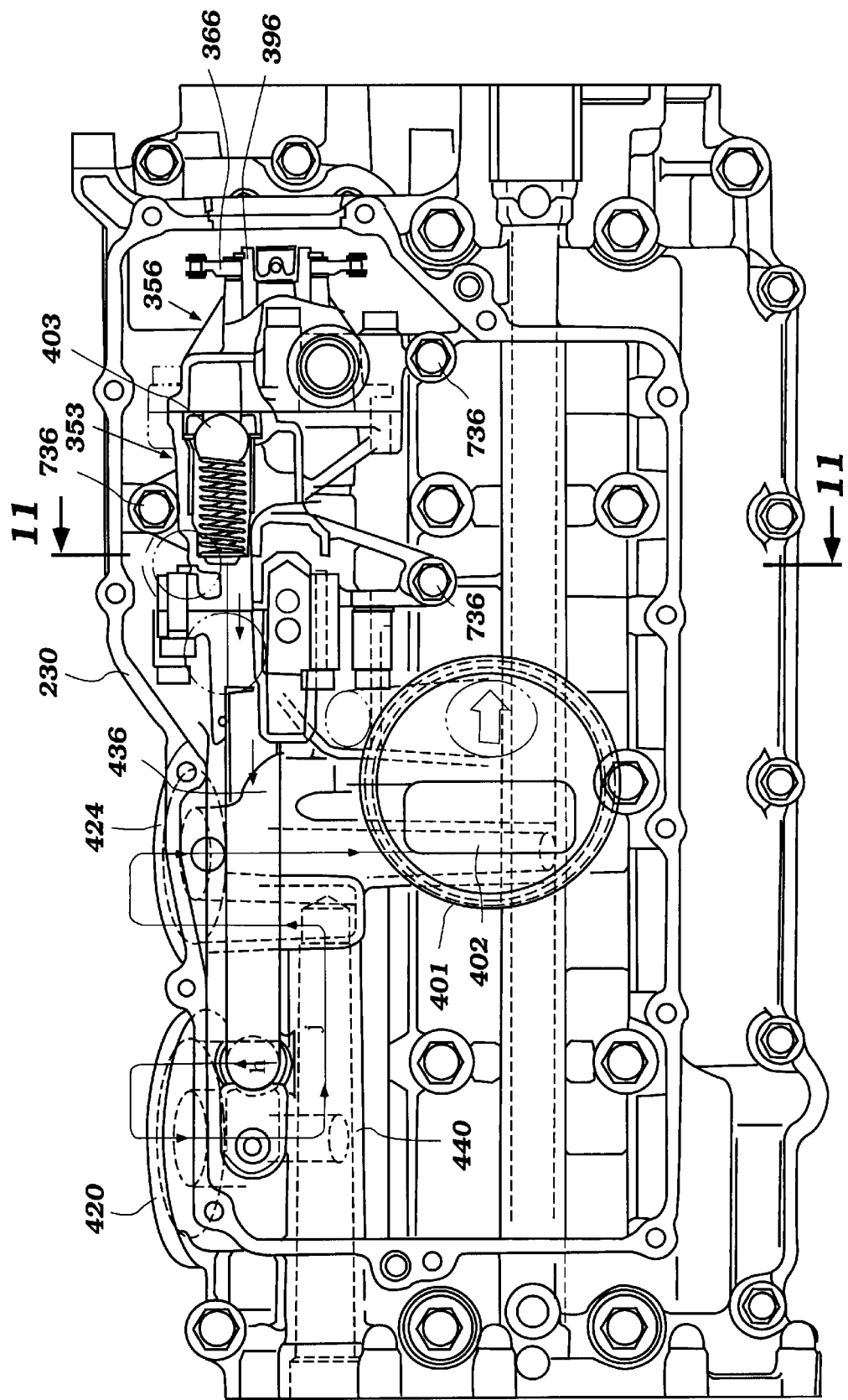
FIG. 8 is a cross-section view of the engine of FIG. 2 taken along the line 8—8 shown in FIG. 7.
Figure 9:
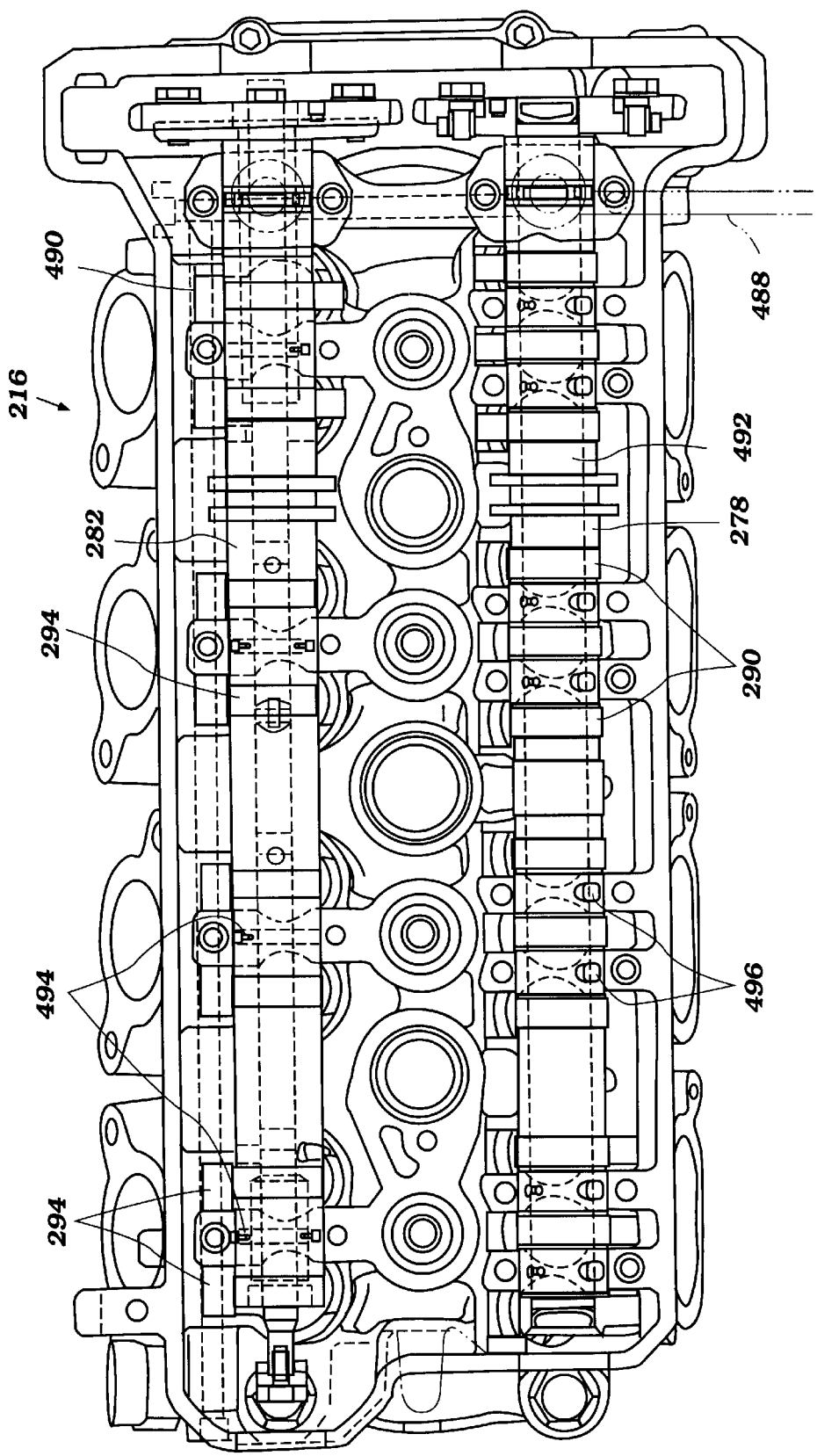
FIG. 9 is a cross-section view of the engine of FIG. 2 taken along the line 9—9 shown in FIG. 4.

With reference to FIGS. 2, 6, and 7, a crankcase member 224 is affixed to the lower end of the cylinder block 204 to define a crankcase chamber 225. In the illustrated arrangement, the crankcase member 224 includes an upper portion 226 and a lower portion 227 joined along the plane P—P (see FIGS. 6 and 7). The crankcase member 224 also defines a breather inlet hole 228 that communicates with the crankcase chamber 225. The breather inlet hole 228 also communicates with at least one breather chamber 229 in a manner discussed more fully below.

With reference to FIG. 7, a crankshaft 232 having a plurality of journal portions 235 and a throw defined, in part, by two adjacent crank webs 234 is rotatably connected to the pistons 212 through the connecting rods 238. A through-hole 233 is provided that extends across a diameter of the crankshaft 232 at each of the journal portions 235. Each of the connecting rods 238 is rotatably coupled to the crank web 234 through a connecting pin 239. That is, the connecting rods 238 are rotatably coupled with the pistons 212 and with the throws of the crankshaft 232. The crankshaft 232 is also journaled in the crankcase member 224 at the journal portions 235 by bearings (not shown). A crankcase cover 236 is affixed to the lower end of the crankcase member 224, extends under the crankshaft 232 and encloses the crankcase chamber 225. The crankcase cover 236 forms, at least in part, a shallow reservoir 237.

The cylinder bore axes O of the engine 28 are inclined with respect to the vertical direction. As a result, lubricant which drains downward through the engine body to the crankcase cover 237 tends to collect in the lower most region of the engine body. As discussed in more detail below, the lubricant that collects in the reservoir 237 is reintroduced into the lubrication system for continued lubrication of the engine 28.

A drive gear 240 is mounted proximate an end of the crankshaft 232. A driven gear 242 is mounted proximate an end of the output shaft 50 and is positioned to be driven by the drive gear 240. A crankshaft cover 250 that covers an end of the crankshaft 232, the drive gear 240, and the driven gear 242 is provided on a lateral side of the crankcase member 224. As described more fully below, rotation of the crankshaft 232 drives the output shaft 50 at an angular speed determined, in part, by the size of each of the drive gear 240 and the driven gear 242, as is known.

The cylinder block 204, the cylinder head member 216, the crankshaft cover 250, and the crankcase member 224 together define an engine body 252. The engine body 252 preferably is made of an aluminum-based alloy. In the illustrated embodiment, the engine body 252 is oriented in the engine compartment 26 so as to position the crankshaft 232 generally perpendicular to an imaginary generally vertical center plane of the snowmobile 20, i.e., to extend generally in the transversely across the snowmobile 20. Other orientations of the engine body 252, of course, are also possible (e.g., with a longitudinal or vertically-oriented crankshaft).

As discussed above, the engine 28 includes an air induction system configured to guide air into the combustion chamber 220. In the illustrated embodiment, the air induction systems includes the intake ports 254 defined in the cylinder head member 216. Intake valves 258 are provided to selectively connect and disconnect the intake ports 254 with the combustion chambers 220. That is the intake valves 258 selectively open and close the intake ports 254.

As discussed above, the charge former 96 is in communication with the air intake box 92 and is also in communication with the fuel system to provide an air fuel mixture appropriate for running conditions of the engine 28 in a known manner. As such, the charge former 96 delivers the mixed air fuel charge to the combustion chamber 220 when intake ports 254 are opened to the combustion chamber 220 by the intake valves 258.

The engine 28 also includes an ignition system. With reference to FIG. 2, spark plugs 262, at least one for each combustion chamber 220, are affixed to the cylinder head member 216. Electrodes, which are defined at one end of the spark plugs 262, are exposed to the respective combustion chambers 220. Sparks plugs 262 preferably are fired in a conventional manner. The air/fuel charge is combusted during every combustion stroke accordingly.

The exhaust system 100, as discussed above in connection with FIG. 1, discharges burnt charges, i.e., exhaust gasses, from the combustion chambers 220. With reference to FIG. 6, the exhaust system includes the exhaust ports 266 for each of the combustion chambers 220. Exhaust valves 270 are provided to selectively connect and disconnect exhaust ports 266 with the combustion chambers 220. That is, the exhaust valves 270 selectively open and close the exhaust ports 266. The exhaust ports 266 communicate with the exhaust runner 102 and the exhaust gasses are eliminated in a manner described above.

The engine 28 has a valvetrain for actuating the intake and exhaust valves 258, 270. In the illustrated embodiment, a double overhead cam-type valvetrain is employed. That is, an intake camshaft 278 actuates the intake valves 258 and exhaust camshaft 282 separately actuates the exhaust valves 270. The intake camshaft 278 extends generally horizontally over the intake valves 258 transversely to the imaginary vertical center plane of the snowmobile 20. Likewise, the exhaust camshaft 282 also extends transversely generally horizontally over the exhaust valves 270.

Both the intake and the exhaust camshafts 278, 282 are journaled by the cylinder head member 216 with a plurality of camshaft caps (not shown). The camshaft caps holding camshafts 278, 282 are fixed to the cylinder head member 216. A cylinder head cover member 286 extends over the camshafts 278, 282 and the camshaft caps, and is affixed to the cylinder head member 216 to define a camshaft chamber.

The intake camshaft 278 has cam lobes 290 associated with the respective intake valves 258, and exhaust camshaft 282 has cam lobes 294 associated with the respective exhaust valves 270. The intake and exhaust valves 258, 270 normally close the intake and exhaust ports 254, 266 by a biasing force of springs. When the intake and exhaust camshafts 278, 282 rotate, the cams lobes 290, 294 push the respective valves 258, 270 to open the respective ports 254, 266 by overcoming the biasing force of the springs. The air, thus, can enter the combustion chamber 220 when intake valves 258 open. In the same manner, the exhaust gasses can move out from the combustion chamber 220 when the exhaust valves 270 open. The crankshaft 232 preferably drives the intake exhaust cam shafts 278, 282 via a valvetrain drive in a known manner.

In operation, ambient air enters the engine cavity 26 through ventilation openings 90 defined in the cover 24. The air is then introduced into a plenum chamber defined by the intake box 92 through the air inlet 93. The air is drawn into charge formers 96. The majority of the air in the intake box 92 is supplied to the combustion chambers 220.

The charge formers 96 regulate an amount of air permitted to pass the combustion chambers 220 in a known manner, e.g., with throttle valves. The opening angles of the throttle valves are controlled by the rider via throttle lever and thus controls the air flow across the valves. The air hence flows into the combustion chambers 220 when the intake valves 258 open. At the same time, the charge formers 96 introduce an air/fuel mixture into the intake ports 254 under the control of an electronic control unit, or ECU. The air/fuel charges are thus formed and delivered to the combustion chambers 220.

The air/fuel charges are fired by the spark plugs 262 under the control of the ECU. The burnt charges i.e., exhaust gasses, are discharged to the atmosphere surrounding the snowmobile 20 through the exhaust systems 100 as discussed above.

The combustion of the air/fuel charges causes the pistons 212 to reciprocate and thus causes the crankshaft 232 to rotate about a crankshaft axis "A." The crankshaft 232 drives the output shaft 50, which in turn drives the transfer shaft 62. The rotation of the transfer shaft 62 is transmitted to the drive belt 70. The rider steers the skis 44 by the handle bar 42. The snowmobile 20 thus moves as the rider desires.

The engine 28 also includes other components relating to engine operations. With reference to FIG. 7, the engine 28 employs a flywheel magneto or AC generator 318 as one of such engine components. The flywheel magneto 318 is connected to the crankshaft 232 by a one-way clutch 320, which, as is known, permits rotation of the flywheel magneto 318 in one direction only. The flywheel magneto 318 generates electric power that is used for the engine operation as well for electrical accessories associated with snowmobile 20. The flywheel magneto 318 is located on one lateral side of the engine 28 and is enclosed by a flywheel magneto housing 322. A starter motor 326 is selectively connectable to the crankshaft 232 to rotate the crankshaft 232 for starting the engine 28. In one embodiment, the starter motor 326 is selectively connectable to the crankshaft via a starter motor gear 327. The starter motor 326 may be powered by a battery (not shown) that is mounted to the snowmobile 20.

Figure 4:
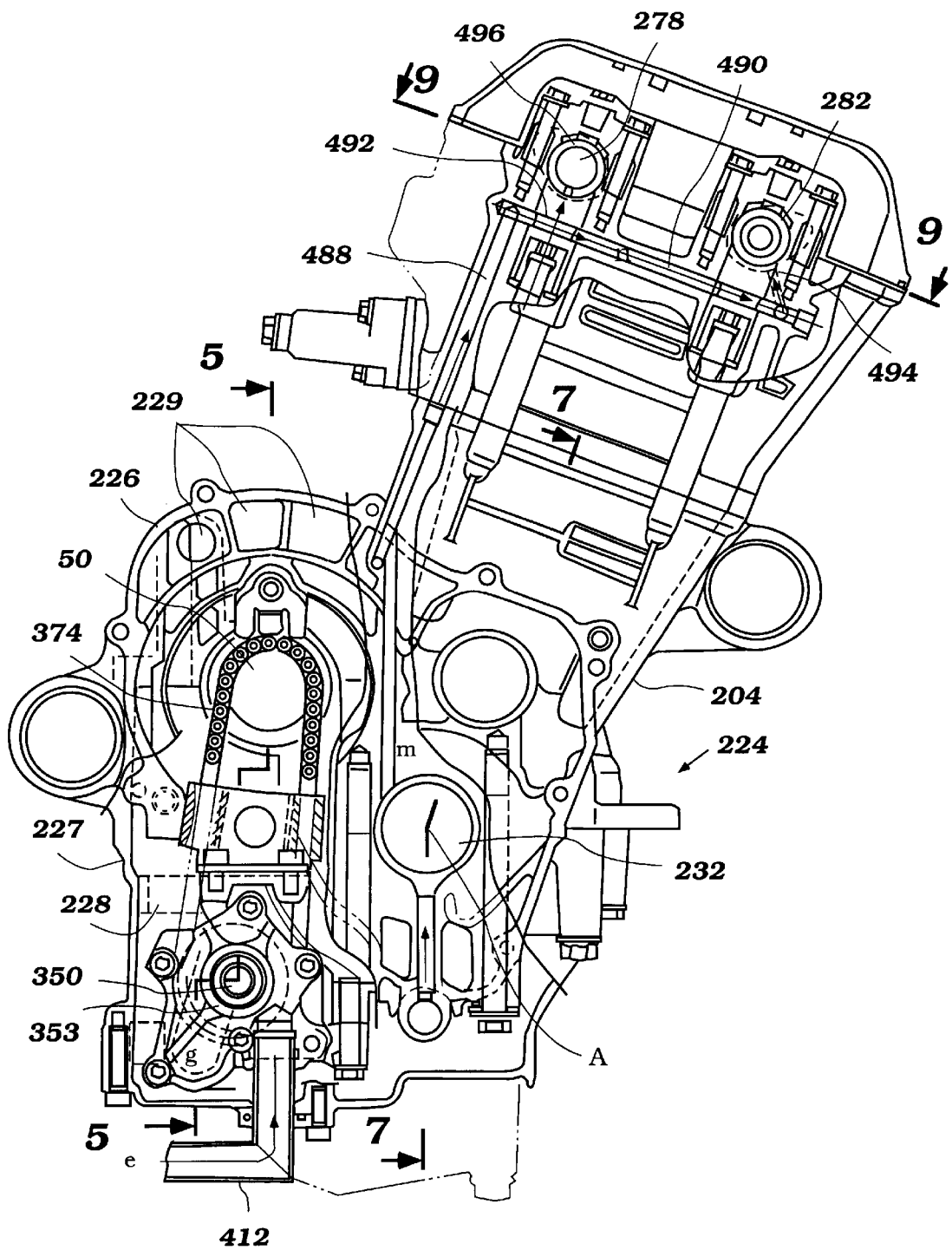
FIG. 4 is a cross-section view of the engine of FIG. 2 taken along the line 4—4 shown in FIG. 7.
Figure 5:
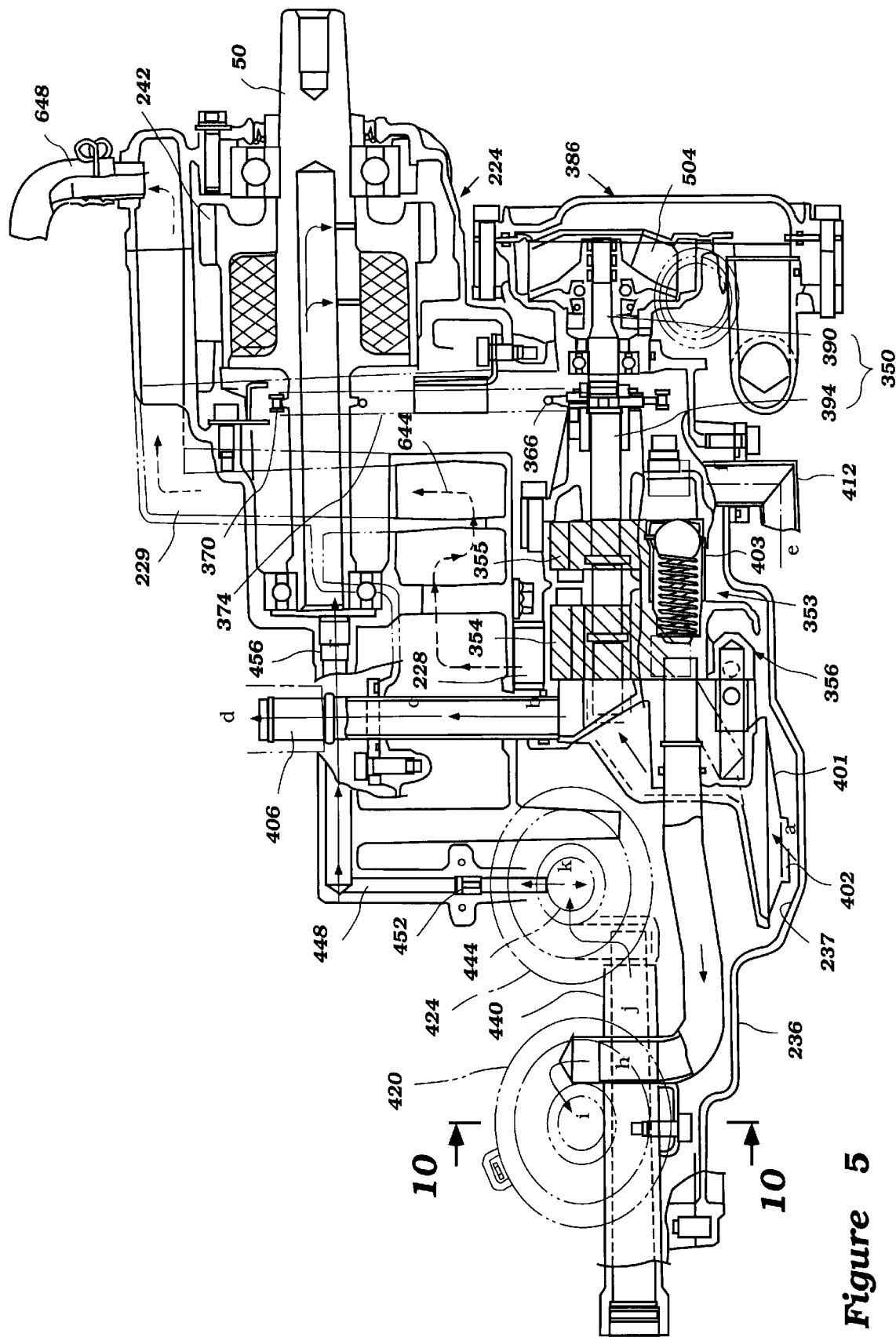
FIG. 5 is a cross-section view of the engine of FIG. 2 taken along the line 5—5 shown in FIG. 4.

With reference to FIGS. 2, 4 and 5, the engine 28 of the snowmobile 20 also comprises a cooling system 398 and a lubrication system 400 that are driven by an auxiliary shaft 350 located in the crankcase 224. The auxiliary shaft 350 includes a coolant pump drive shaft 390 and a lubricant pump drive shaft 394 that are joined at a coupling 396. A lubricant pump assembly 353 that includes a primary lubricant pump 354 and a secondary lubricant pump 355 preferably is configured to receive the lubricant pump drive shaft 394, as discussed below. A coolant pump 504 preferably is configured to receive the coolant pump drive shaft 390. The lubrication system 400, which is a dry-sump type lubrication system, will be discussed in greater detail below. The cooling system 398 will be discussed in more detail below in connection with FIGS. 12–14.

The auxiliary shaft 350 is preferably driven by the output shaft 50 through an auxiliary drivetrain 362. The auxiliary drivetrain 362 includes an auxiliary shaft sprocket 366, an output shaft sprocket 370, and an auxiliary flexible transmitter 374. The auxiliary shaft sprocket 366 is connected to the auxiliary shaft 350. In the illustrated embodiment, the flexible transmitter 374 is a chain. The auxiliary flexible transmitter 374 is wound around the auxiliary shaft sprocket 366 and the output shaft sprocket 370. One of ordinary skill in the art will appreciate that a belt and pulley arrangement can also be used in place the flexible transmitter 374 and the sprockets 366, 370. When the output shaft 50 rotates, the output shaft sprocket 370 drives the auxiliary shaft sprocket 366 via the flexible transmitter 374, and thus the auxiliary shaft 350 also rotates. This rotational motion drives the lubricant pumps and the coolant pump as discussed below.

A lubricant pump housing 378 is provided on the crankcase member 224 to at least partially house the lubricant pump unit 356. A coolant pump housing 382 is provided proximate the lubricant pump housing 378 to at least partially house the coolant pump 504. A coolant pump housing cover 386 is provided on one side of the crankcase 224 to at least partially enclose the coolant pump 504 and the auxiliary shaft 350.

The lubrication system 400 includes the shallow reservoir 237, the lubricant pump unit 356, and a lubricant supply, such as a lubricant tank 405. The lubricant pump unit 356 includes the lubricant pump assembly 353, which includes the primary lubricant pump 354 and the secondary lubricant pump 355. The lubricant pump unit 356 also includes a lubricant strainer 401 that includes a lubricant intake port 402, a lubricant check valve 403, and a lubricant relief valve 404. In one embodiment, the lubricant relief valve 404 includes a spring 404a that can be displaced to increase the volume within the relief valve 404. More details of the lubricant pump unit 356 are discussed below in connection with FIGS. 15–17.

The lubricant supply 405 is positioned within the cover 24 of the snowmobile 20 in one embodiment. In another embodiment, the lubricant supply 405 is a lubricant pan which may be positioned within the engine 28. A lubricant supply passage 406 connects the primary lubricant pump 354 of the lubricant pump unit 356 to the lubricant supply 405 and provides fluid communication therebetween. Lubricant that collects in the shallow reservoir 237 is drawn up by the primary lubricant pump 354 (as indicated by a lubricant flow line "a" in FIG. 5) and delivered to the lubricant supply 405 through the lubricant supply passage 406 (as indicated by a lubricant flow line "b," a lubricant flow line "c," and a lubricant flow line "d"). A lubricant passage 412 provides fluid communication between the lubricant supply 405 and the secondary lubricant pump 355 of the lubricant pump unit 356. The secondary lubricant pump 355 draws lubricant from the lubricant supply 405 through the lubricant supply passage 412 as indicated by a lubricant flow line "e" and a lubricant flow line "f." The secondary lubricant pump 353 then supplies the lubricant to many of the components of the engine 28 through a series of lubricant supply passages.

The supply of the lubricant is regulated by the check valve 403, which prevents backflow of the lubricant to the lubricant pump assembly 353, and the relief valve 404. As discussed above, the relief valve 404 includes the spring 404a, which can be compressed by a portion of the relief valve 404 to increase the volume in the relief valve 404. By increasing the volume of the valve 404, the fluid pressure in the system downstream of the secondary pump 355 is reduced.

Figure 3:
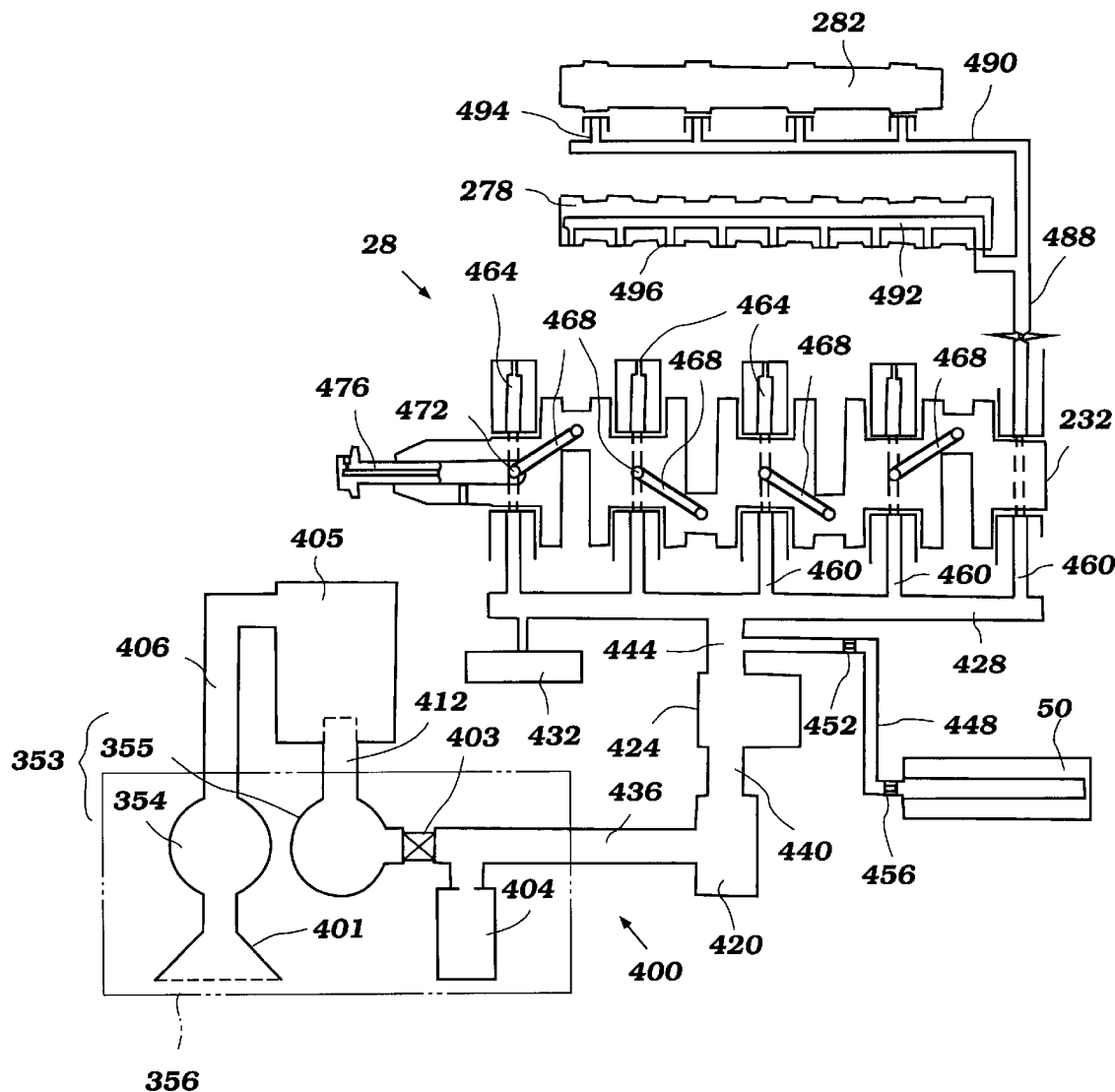
FIG. 3 is a schematic view of a lubrication system of the engine of FIG. 2.

With reference to FIG. 3, the lubrication system 400 also comprises a lubrication cooler 420, a lubrication filter 424, a lubricant main gallery 428, and a hydraulic pressure sensor 432. The hydraulic pressure sensor 432 provides lubricant pressure information to the ECU and/or the rider. A lubricant supply passage 436 connects the lubricant pump unit 356 to the lubricant cooler 420 and provides fluid communication therebetween. Lubricant is delivered by the lubricant pump unit 356 into the passage 436 and thereby to the lubricant cooler 420, as indicated by a lubricant flow line "g." The lubricant cooler 420 includes a heat exchanger 422 and a heat exchange passage 423. Lubricant that enters the lubricant cooler 420 flows through the heat exchange passage 423 (as indicated by a lubricant flow line "i") and is cooled therein. A lubricant passage 440 provides fluid communication between the lubricant cooler 420 and the lubricant filter 424. Thus, lubricant is directed from the lubricant cooler 420 to the lubricant filter 424, as indicated by a lubricant flow line "j." A lubricant supply line 444 provides fluid communication between an outlet of the lubricant filter 424 and the main gallery 428 (as indicated by a lubricant flow line "k").

In one embodiment, the lubricant cooler 420 and the lubricant filter 424 are positioned on the same side of the engine as the lubricant pump unit 356. That is, the lubricant cooler 420, the lubricant filter 424, and the lubricant pump unit 356 are all positioned on a forward-facing side of the engine (see FIG. 2). Preferably, the lubricant pump unit 356, the lubricant cooler 420, and the lubricant filter 424 are arranged transversely across the engine 28 at about the same elevation. In another embodiment, the lubricant pump unit 356 and the lubricant cooler 420 are positioned on the same side of the engine 28, e.g., the forward-facing side. In another embodiment, the lubricant pump unit 356 and the lubricant filter 424 are positioned on the same side of the engine 28. By positioning at least two of the lubricant pump unit 356, the lubricant cooler 420, and the lubricant filter 424 on the same side of the engine 28, the engine can be reduced in size and can more easily fit into the engine compartment 26. In addition, by positioning these components as described herein, the complexity of the lubrication system 400 can be reduced, e.g., by allowing a less complex system of lubricant supply passages.

A lubricant supply passage 448 branches off from the lubricant passage 444 and provides fluid communication between the passage 448 and the output shaft 50. Preferably a first orifice 452 and a second orifice 456 are located in the lubricant supply passage 448 to regulate the lubricant pressure (or lubricant flow rate) within the passage 448. This provides an appropriate amount of lubricant to the bearings of the output shaft 50, which are ball bearings in one embodiment. Lubricant flow through the lubricant supply passage 448 is illustrated by a lubricant flow line "r" (see FIG. 5). It should be recognized that fewer than two such orifices could be provided in the passage 448 and that other approaches can be provided that regulate lubricant flow in the lubricant supply passage 448.

The lubricant main gallery 428 provides lubricant to various components of the engine 28. Lubricant flow in the main gallery 428 is indicated by the lubricant flow line "l." The hydraulic pressure sensor 432 advantageously is in fluid communication with the lubricant main gallery 428. A plurality of lubricant supply passages 460 branch off the lubricant main gallery 428 and are in fluid communication with the journal portion 235 of the crankshaft 232 to provide lubricant thereto. Each through-hole 233 in the journal portions 235 connects the passages 460 to a lubricant supply passage 464 that directs lubricant into the cylinder bores 208 and to a lubricant supply passage 468 that directs lubricant to the connecting pins 239.

A lubricant passage 472 branches off the lubricant passage 460 nearest to the rotor 318 to supply lubricant to the rotor 318 and to the journal portion 235 of the crankshaft 232 that is closest to the rotor 318. Lubricant in the passage 472 is delivered through a passage 476 to a lubricant port 480. A port 484 is provided in fluid communication with the passage 472 to supply lubricant to a bushing 486 positioned around the journal portion 235 of the crankshaft 232 that is closest to the rotor 318.

A valvetrain lubricant passage 488 also branches off the main gallery 440. Lubricant flow in the lubricant passage 488 is indicated by a lubricant flow line "m" (see FIGS. 4, 7, and 9). The valvetrain lubricant passage 488 bifurcates into a first branch 490 and a second branch 492. The first branch 490 carries lubricant to a plurality of lubricant ports 494 that communicate with the exhaust camshaft 282 to lubricate the camshaft 282. The second branch 492 carries lubricant to a plurality of lubricant ports 496 that communicate with the intake camshaft 278 to lubricate the camshaft 278.

Figure 12:
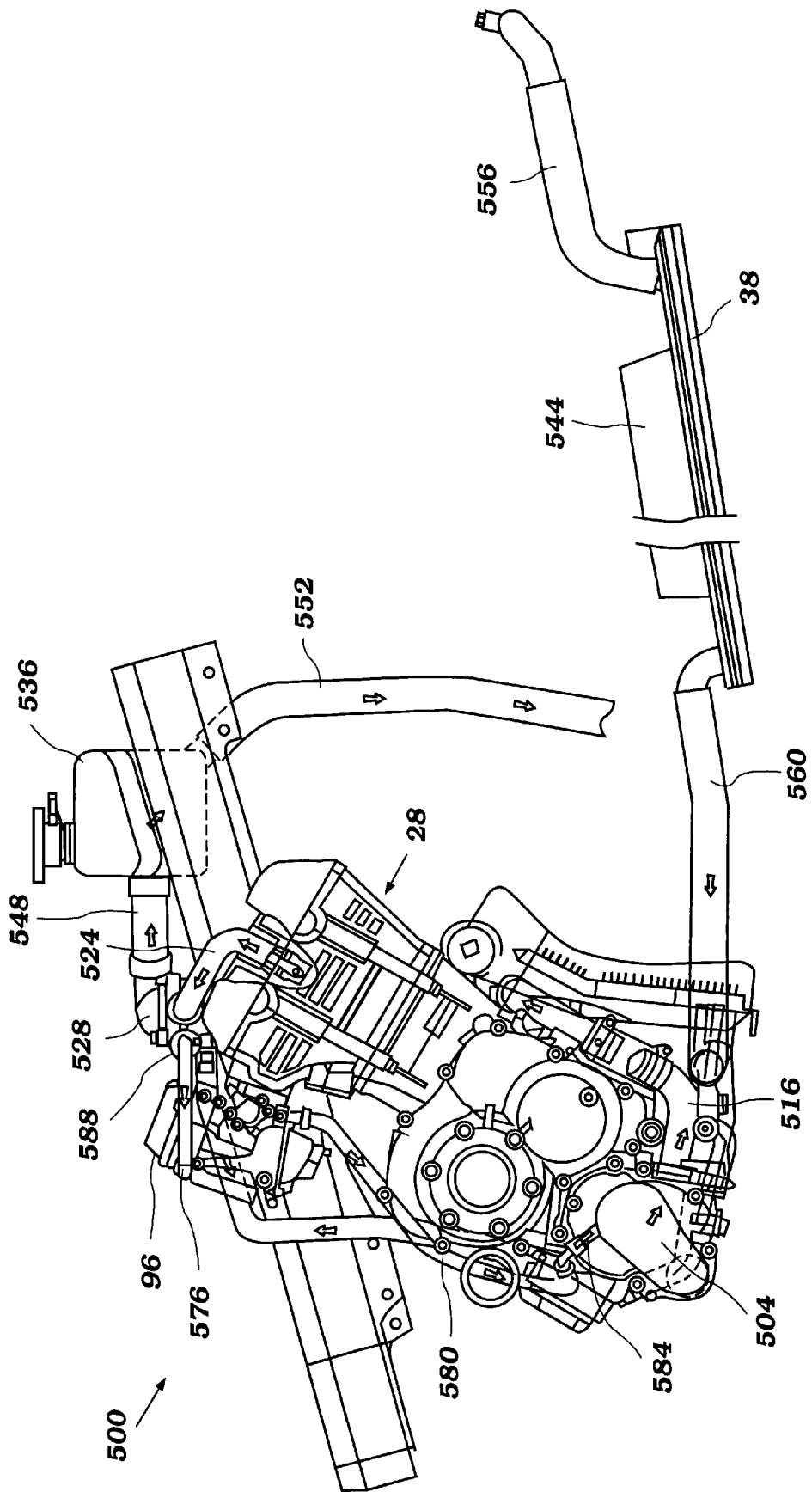
FIG. 12 is a side elevation view of one embodiment of an engine cooling system of the snowmobile of FIG. 1.
Figure 13:
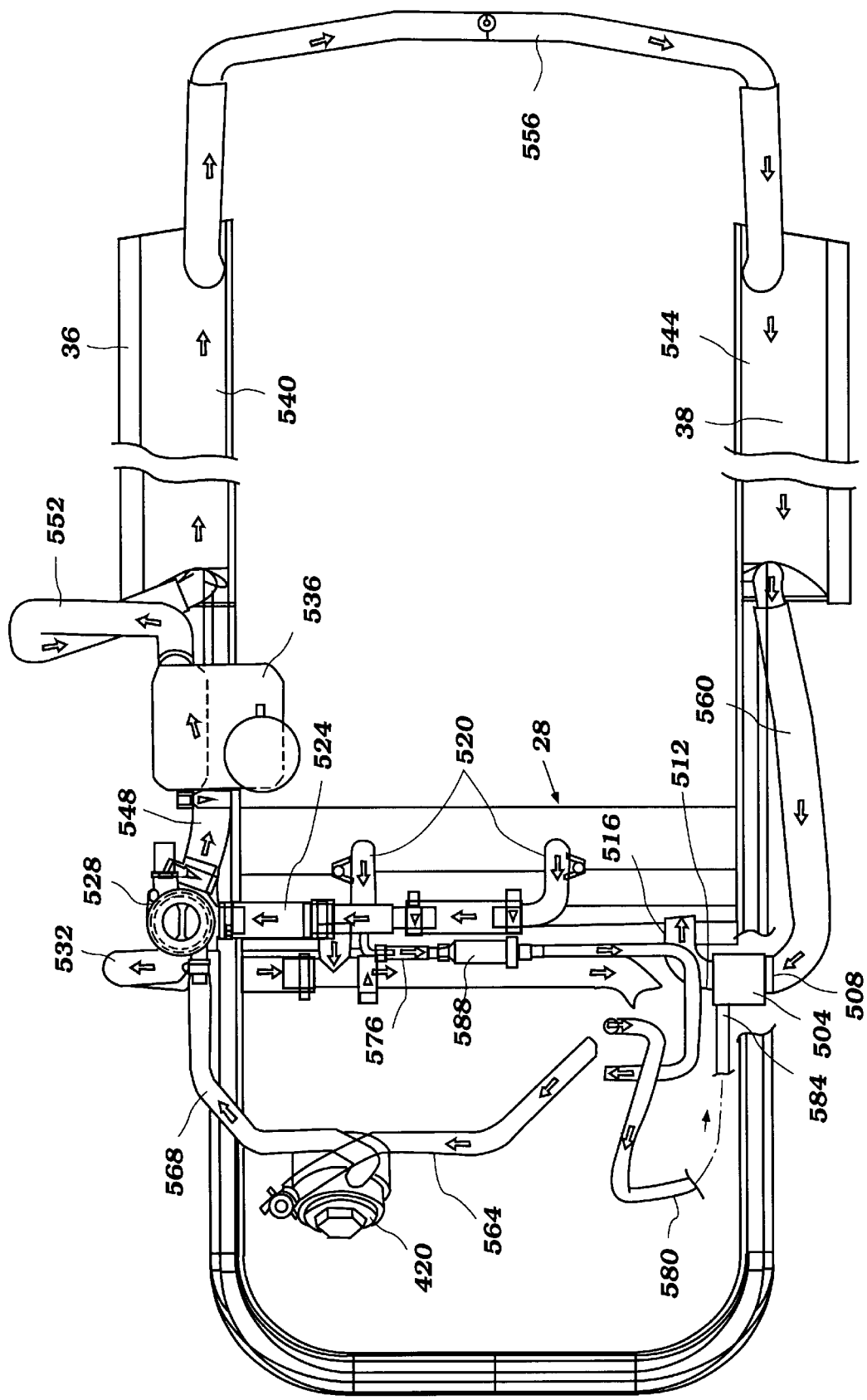
FIG. 13 is a top view of the cooling system of FIG. 12.
Figure 14:
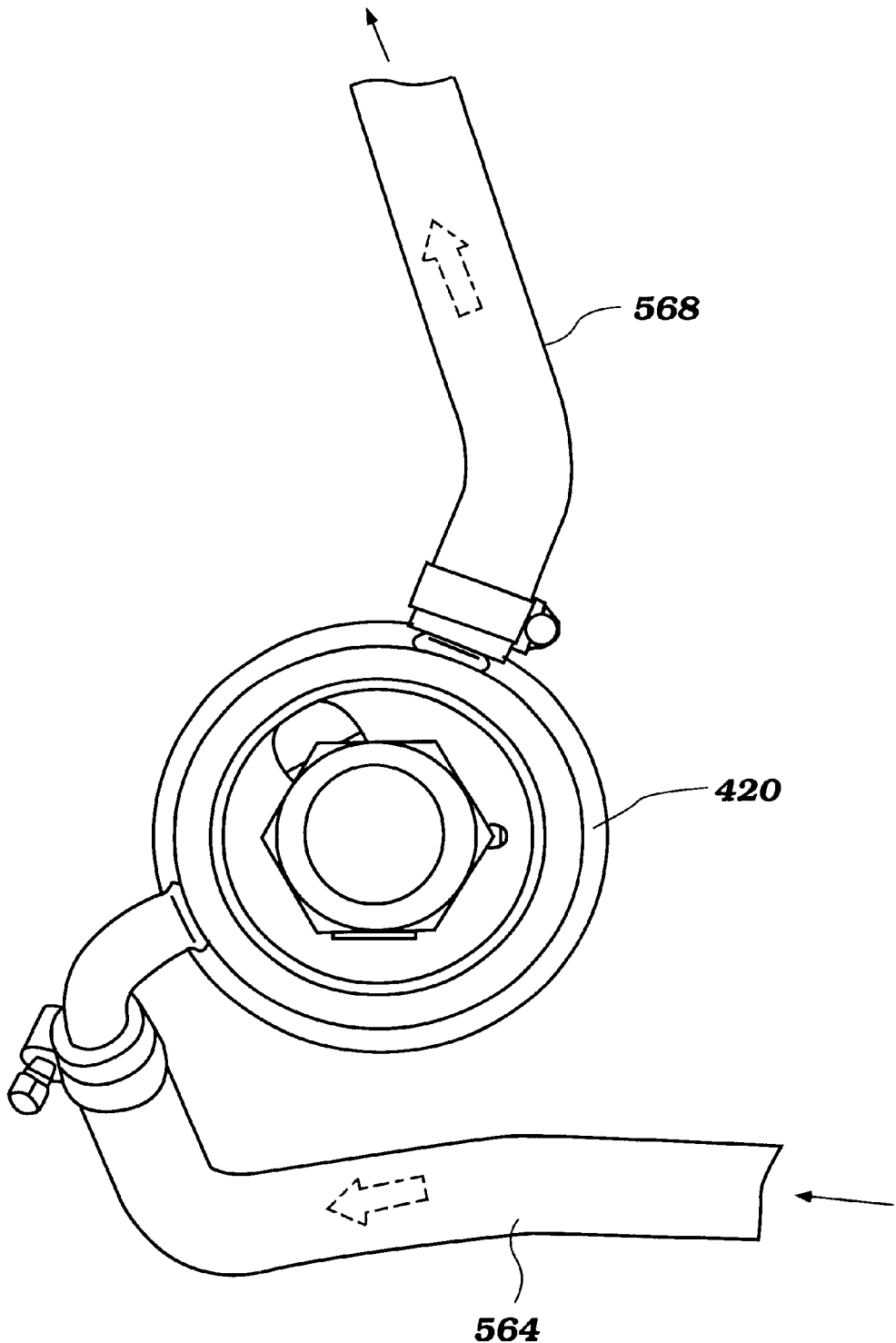
FIG. 14 is a top view of a lubricant cooler of the engine of FIG. 2 showing the connection of the cooler to the cooling system of FIGS. 12 and 13.

As discussed above, the engine 28 also includes the cooling system 398. With reference now to FIGS. 12–14, the cooling system 398 is connected to the frame 22 and to the engine 28 of the snowmobile 20. In one embodiment, the cooling system 398 includes several coolant branches driven by the coolant pump 504. The coolant pump 504 has a coolant inlet port 508 and a coolant outlet port 512.

A first cooling system branch begins at the outlet port 512 and includes a coolant passage 516 that extends between the outlet port 512 and the engine 28. A portion of the coolant that is supplied by the coolant pump 504 is provided through the coolant passage 516 and is circulated through the engine body to cool various components 32 thereof. A plurality of coolant passages 520 extend between the engine 28 and a coolant merge passage 524. The coolant merge passage 524 is connected to a temperature regulator 528 through which the coolant in the cooling system 398 flows. A coolant passage 532 extends between the temperature regulator 528 and the inlet port 508 of the coolant pump 504. When the engine 28 is first started and is, therefore, cold, the temperature regulator 528 routes most of the coolant through the first branch of the cooling system 398. As the temperature of the engine 28 rises, at least a portion of the coolant is circulated through a second coolant branch.

The second coolant branch includes a coolant supply, such as the coolant tank 536, a right-side heat exchanger 540, a left-side heat exchanger 544, the coolant pump 504 and coolant passages interconnecting each of these components. A coolant passage 548 that extends between the temperature regulator 528 and the coolant tank 536 carries coolant from the first coolant branch to the coolant tank 536. A coolant passage 552 that extends between the coolant tank 536 and the right-side heat exchanger 540 carries coolant to the heat exchanger 540. In one embodiment, the heat exchanger 540 is at least partially located proximate the right-side step 36. The heat exchanger 540 removes heat from the coolant in a known manner. A coolant passage 556 that extends between the right-side heat exchanger 540 and the left-side heat exchanger 544 carries coolant to the left-side heat exchanger 544. In one embodiment, the left-side heat exchanger 544 is located at least partially proximate the left-side step 38. As with the right-side heat exchanger 540, the left-side heat exchanger 544 removes heat from the coolant flowing therethrough. A coolant passage 560 that extends between the left-side heat exchanger 544 and the inlet port 508 of the coolant pump 504 carries coolant back to the coolant pump 504 for further circulation through the engine 28 and associated components.

In one embodiment, a third coolant branch is provided in the cooling system 398 to cool the lubricant in the lubrication system 400 of the engine 28. A coolant passage 564 branches off from the coolant passage 516 and is in fluid communication with an inlet side of the lubricant cooler 420. A coolant passage 568 extends from an outlet side of the lubricant cooler 420 to the temperature regulator 528 and connects thereto. A portion of the coolant from the coolant pump 504 is delivered into the coolant passage 564. This coolant flows through the lubricant cooler 420, which includes the heat exchanger 422 to transfer heat from the lubricant in the lubrication system 400 to the coolant (see FIG. 10). In some running conditions, the lubricant can be warmed by the coolant flowing therethrough. After flowing through the lubricant cooler 420, the coolant is carried by the coolant passage 568 back to the temperature regulator 528 for further circulation in the cooling system 398.

In one embodiment, the cooling system 398 includes another branch that communicates with the charge former 96. A coolant passage 576 branches off from the coolant merge passage 524 and connects to an inlet side of a heat exchanger associated with the charge former 96. A coolant passage 580 extends from an outlet side of the heat exchanger associated with the charge former 96 to a secondary inlet 584 of the coolant pump 504. An auxiliary temperature regulator 588 is provided proximate the coolant passage 576 to control the flow of coolant therein.

Figure 15:
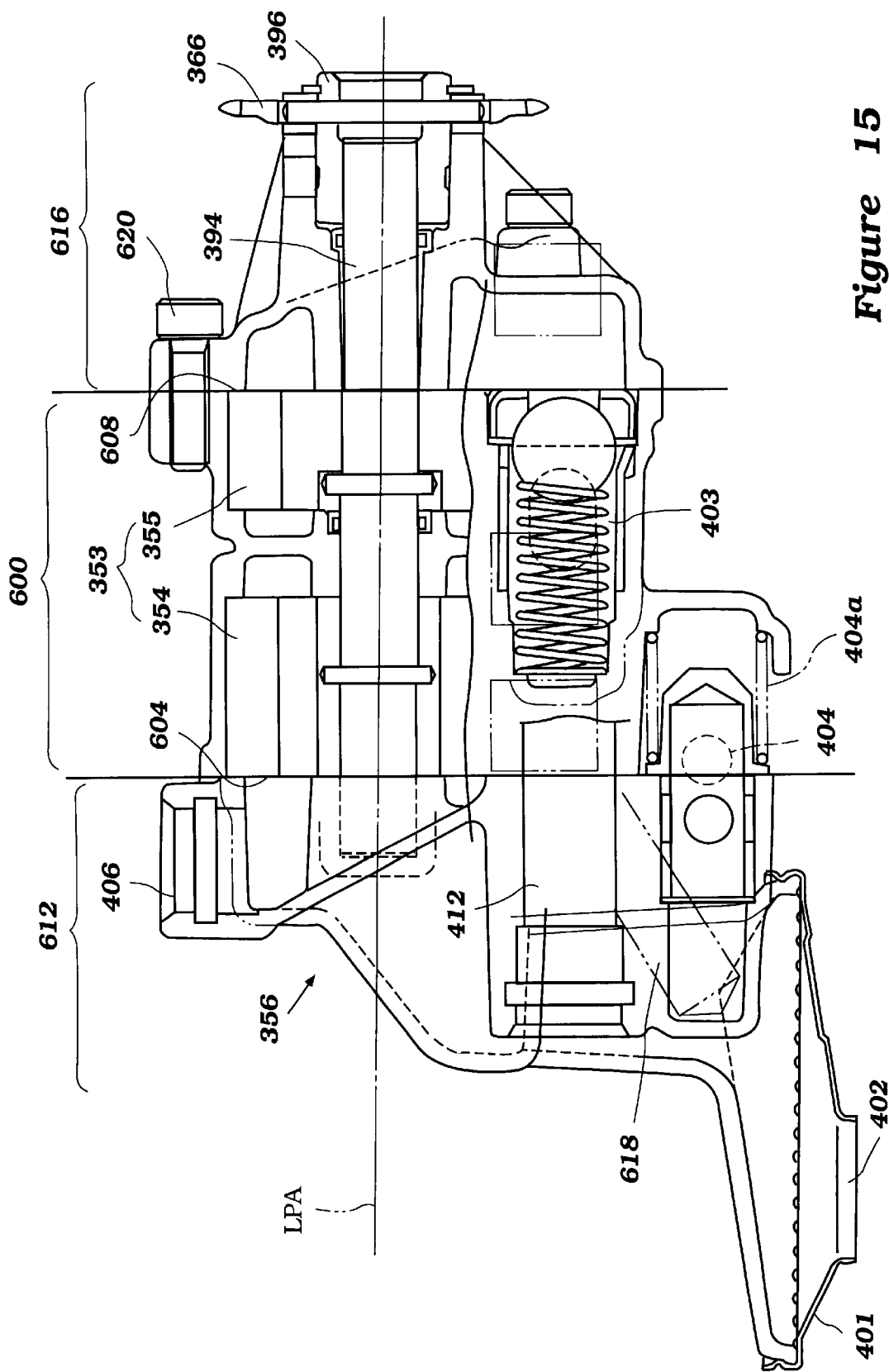
FIG. 15 is a side elevation view of one embodiment of a lubricant pump unit with certain portions broken away and other internal portions shown in hidden line to better illustrate certain features, aspects and advantages of the present invention.
Figure 16:
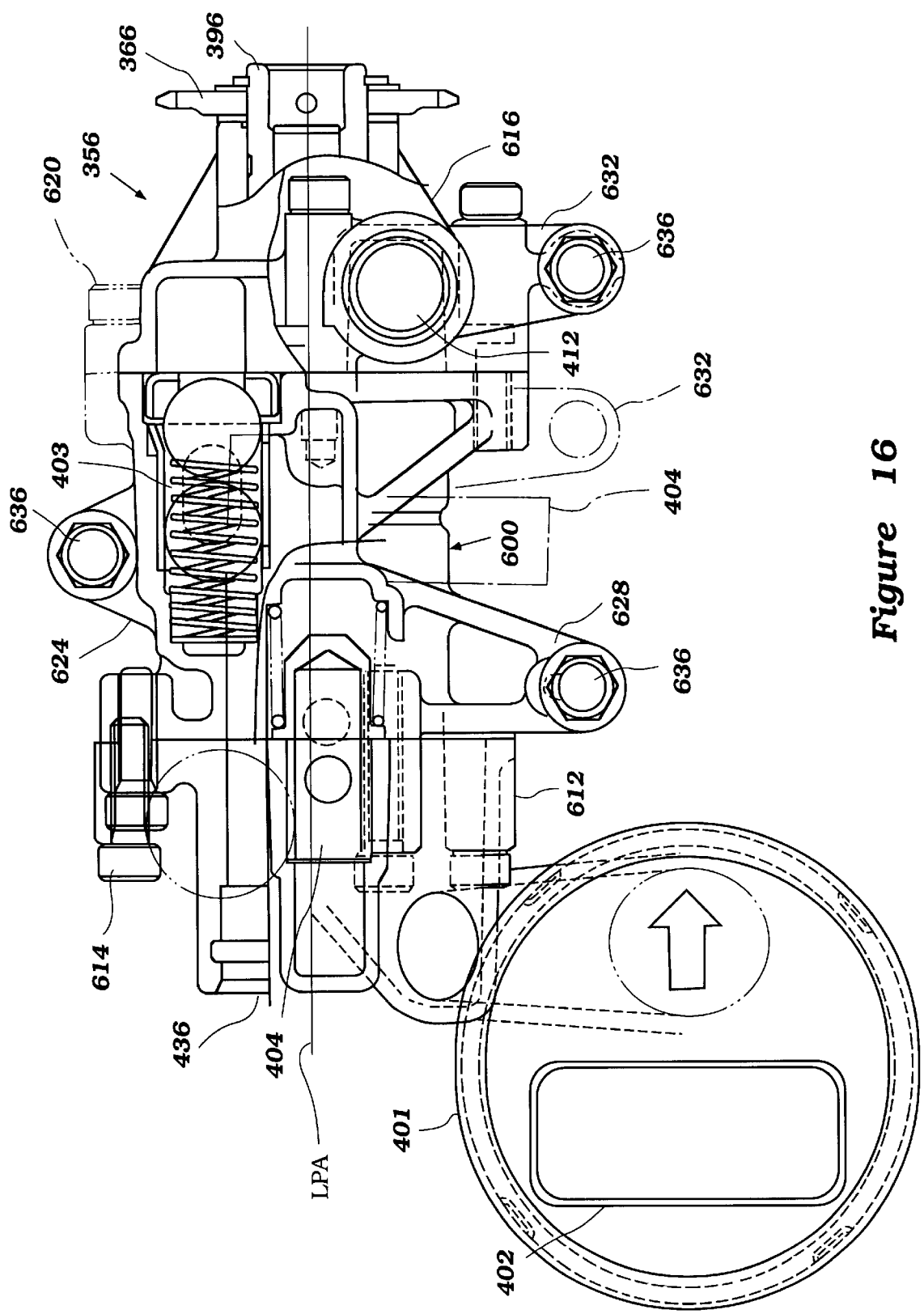
FIG. 16 is a bottom view of the lubricant pump unit of FIG. 15.
Figure 17:
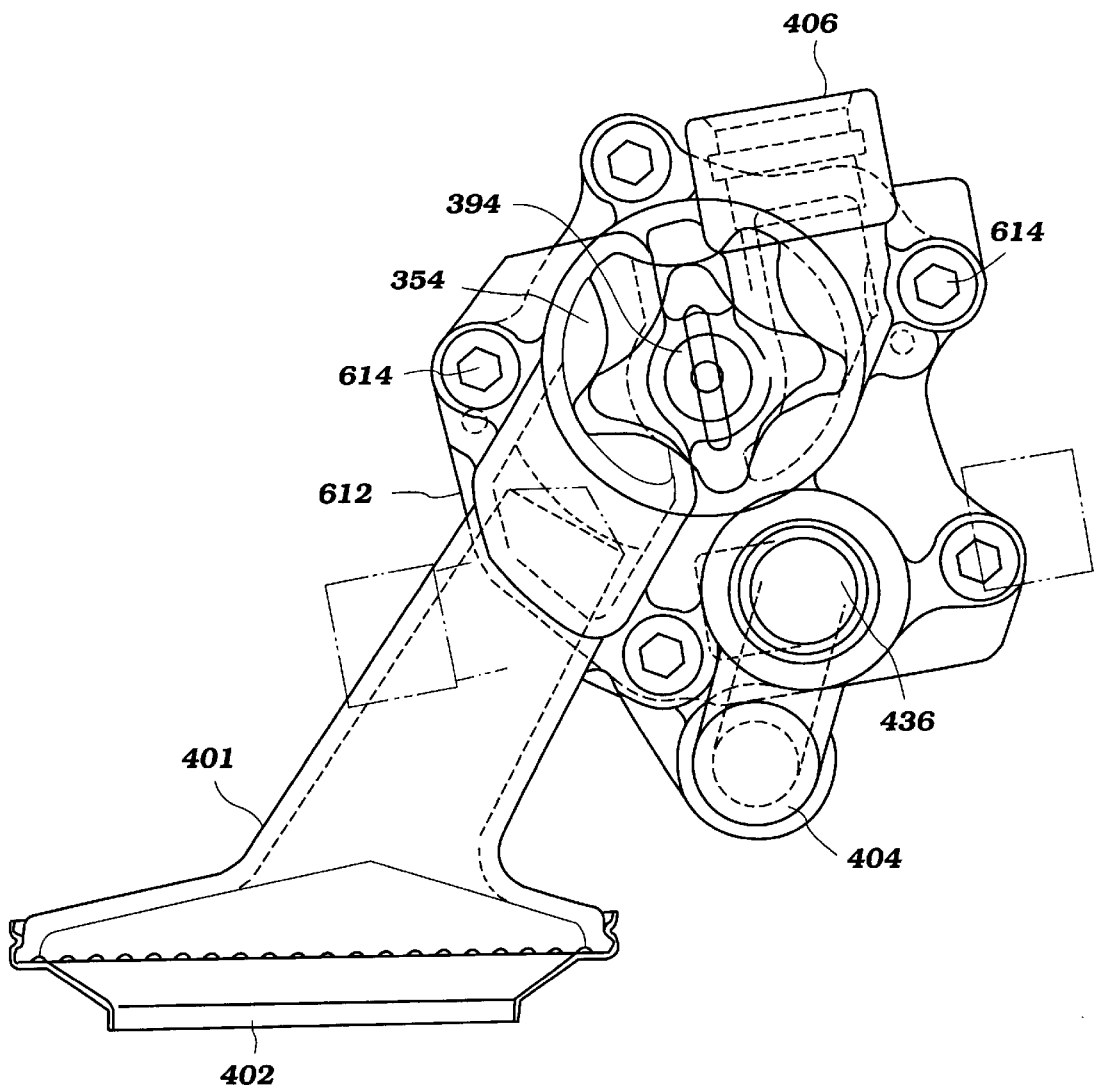
FIG. 17 is a side elevation view of the lubricant pump unit of FIG. 15.

With reference to FIGS. 15–17, the lubricant pump unit 356 is shown in more detail. The lubricant pump unit 356 includes, in one embodiment, a main body portion 600 having a first side 604 and a second side 608. In one embodiment, the main body portion 600 is a housing that at least partially encloses the primary lubricant pump 354 and the secondary lubricant pump 355. A first cover member 612 is associated with the first side 604 of the main body portion 600. In the illustrated embodiment, the first cover member 612 is connected to the main body portion 600 by one or more bolts 614 (see FIGS. 16 and 17). As discussed above, the lubrication system 400 includes the strainer 401 and the lubricant intake port 402. In one embodiment, the strainer is provided in the first cover member 612.

In one embodiment, the first cover member 612 also includes a lubricant passage 618 that provides fluid communication between the primary lubricant pump 354 and the lubricant intake port 402. Lubricant can thus be drawn up by the primary lubricant pump 354 through the lubricant intake port 402 and through the strainer 401. As the lubricant is being drawn through the strainer 401, particles or debris that may collect in the shallow reservoir 237 are removed from the lubricant. As discussed above, the lubricant that is drawn through the strainer 401 is thus delivered to the lubricant supply 405 through the lubricant supply passage 406 free of such debris removed by the strainer 401.

The lubricant pump unit 356 also includes, in one embodiment, a second cover member 616. The second cover member is associated with the second side 608 of the main body portion 600. In one embodiment, the second cover member 616 is connected to the main body portion 600 by one or more bolts 620 (see FIG. 15). Of course, one or more of the main body portion 600, the first cover member 612, and the second cover member 616 could be combined.

The lubricant pump unit 356 forms an elongated body that extends along a lubricant pump axis LPA that is coincident with the axis of rotation of the lubricant pump drive shaft 394, shown in FIG. 15. The main body portion 600 and the first cover member 612 are positioned along the lubricant pump axis LPA of the lubricant pump unit 356. The lubricant pump unit 356 is configured to be mounted in the crankcase chamber 225 at a location where the lubricant pump axis LPA is offset from the crankshaft axis "A."

In one embodiment, the lubricant pump unit 356 includes a first mount boss 624, a second mount boss 628, and a third mount boss 632. The mount bosses 624, 628, and 632 each include a through-hole to receive a bolt 636, which affix the lubricant pump unit 356 to the crankcase member 224. In one embodiment, lubricant pump unit 356 is constructed so that the relief valve 404 extends along an axis generally parallel to the axis LPA. With reference to FIG. 16, in this embodiment, the relief valve 404 is positioned generally between the mount boss 624 and the mount boss 628. The relief valve 404 in this embodiment is also mounted to a lateral side of a plane extending through the center of the through hole of the mount boss 624 and extending perpendicular to the axis LPA. In one embodiment, the relief valve 404 is located on the same lateral side of this plane as is the first cover member 612.

In one embodiment, the lubricant pump unit 356 is constructed so that the relief valve 404 extends along an axis that is generally perpendicular to the axis LPA. In the embodiment having a generally perpendicular orientation, the relief valve 404 is located between the mount bosses 628 and the mount boss 632.

As discussed above, the lubricant pump unit 356 includes a lubricant pump assembly 353 that includes the primary lubricant pump 354 and the secondary lubricant pump 355. The primary lubricant pump 353 is configured to transfer lubricant that collects in the shallow reservoir 237 to the lubricant supply 405. In one embodiment, the primary lubricant pump 353 has generally more capacity than the secondary lubricant pump 354.

FIG. 16 shows that the mount bosses can be located on the main body portion 600, the first cover member 612, or the second cover member 616 of the lubricant pump unit 356. In the illustrated embodiment, the first mount boss 624 is located on one lateral side of the main body portion 600 of the lubricant pump unit 356. The second mount boss 628 is located on the opposite lateral side of the lubricant pump unit 356, also on the main body portion 600. FIG. 16 shows that the third mount boss 632 can be located in at least two different locations. The mount boss 632 can be located on the second cover member 616 or on the main body portion 600. As with the third mount boss 632, in another variation, the first mount boss 624 and/or the second mount boss 628 are located on one of the first cover member 612 or the second cover members 616.

Figure 11:
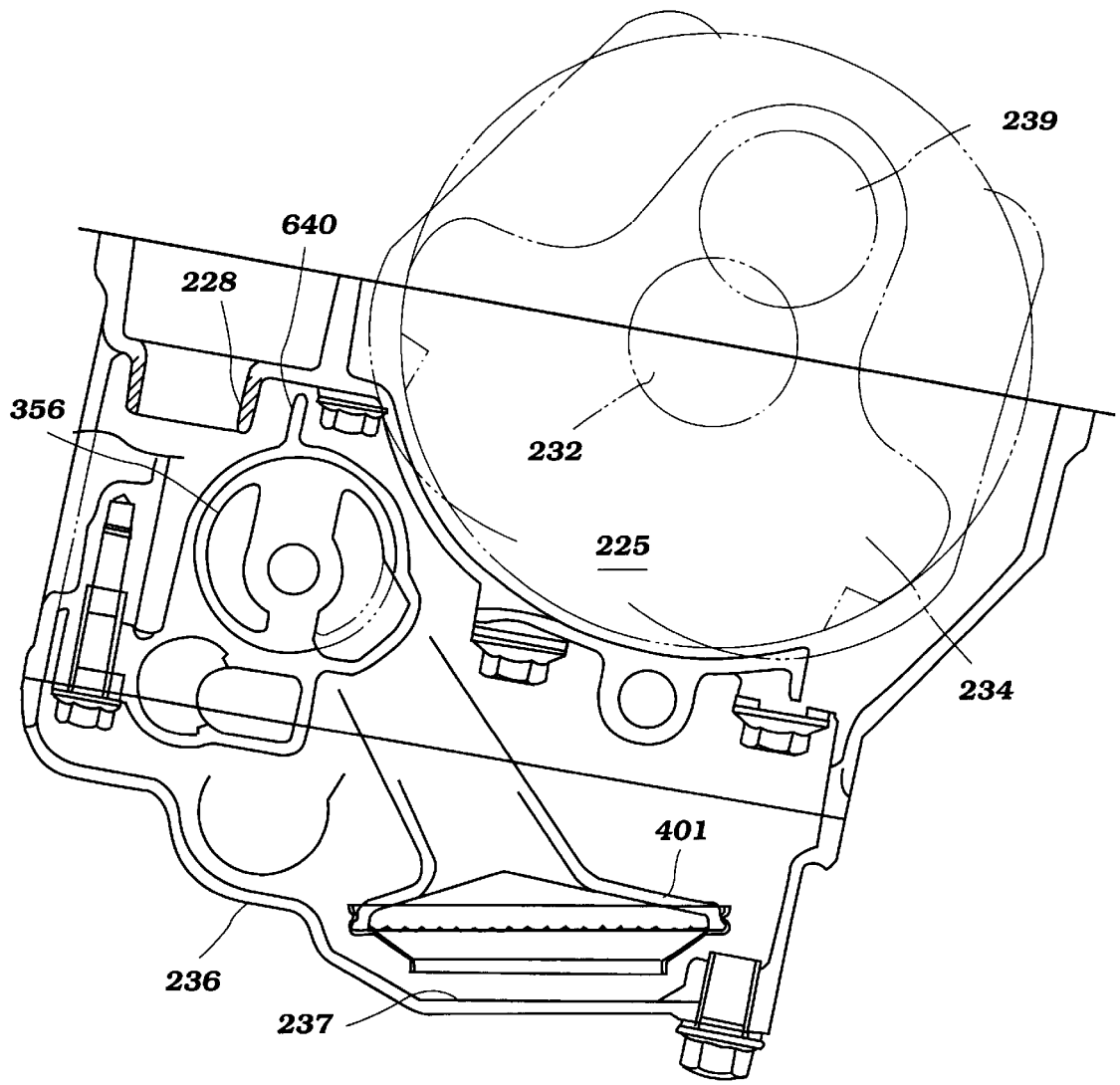
FIG. 11 is a cross-section view of the engine of FIG. 2 taken along the line 11—11 shown in FIG. 8.

With reference to FIGS. 4 and 11, the lubricant pump unit 356 in one embodiment also comprises a rib 640. Air from the crankcase chamber 225 and from the region proximate the shallow reservoir 237 communicates with the breather inlet hole 228. The air is carried through the breather passage 229, which is preferably a winding passage, indicated in FIG. 4 by the dotted lines 644. The air is separated thereby from the lubricant. The breather passage 229 is preferably located above the auxiliary axis 390. The air is returned to the air induction system through a breather pipe 648.

Figure 10:
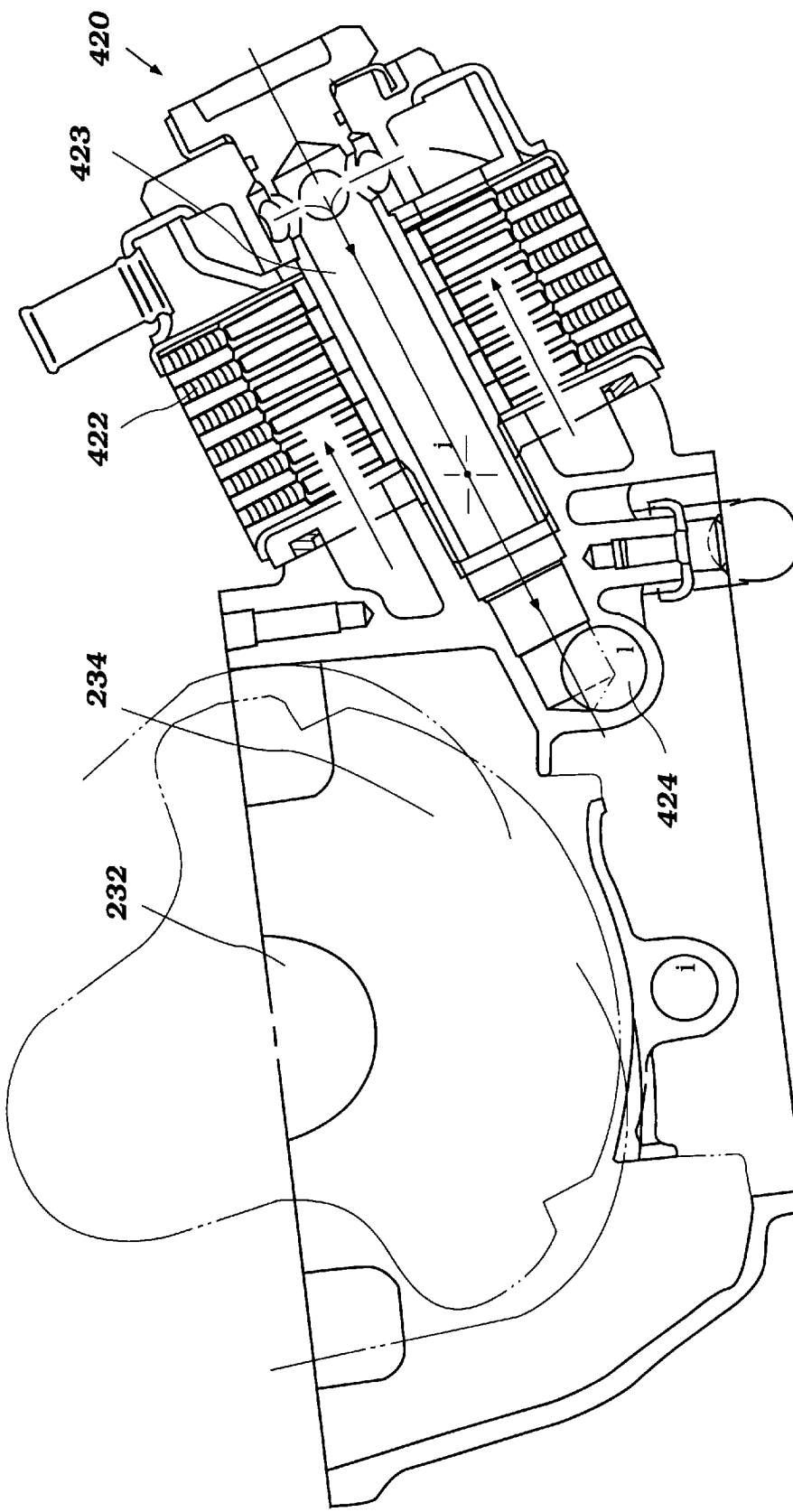
FIG. 10 is a cross-section view of the engine of FIG. 2 taken along the line 10—10 shown in FIG. 5.

Referring to FIG. 10, the rib 644 protrudes from an upper surface of the lubricant pump unit 356. In one embodiment, the rib 644 is positioned on the main body portion 600. In another embodiment, the rib 644 is positioned on the first cover member 612. In another embodiment, the rib 644 is positioned on the second cover member 616. The rib 644 is formed adjacent to the breather inlet hole 228 and functions as an insulation wall to restrict the outflow of the lubricant by blocking the breather inlet hole 228. The rib 644 prevents the lubricant from spattering into the breather inlet hole 228 as a lubricant mist when the lubricant drips from a hole (not shown) at a bottom of the crank chamber 225 toward the crankcase cover 236.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A snowmobile comprising:
    a frame assembly defining a longitudinal vertical plane and a transverse vertical plane;
    an internal combustion engine mounted generally along the transverse vertical plane of the frame assembly, the internal combustion engine comprising:
        a cylinder block defining a cylinder bore;
        a crankcase connected to the cylinder block defining a crankcase chamber, the crankcase having a crankshaft journaled therein, the crankshaft rotatable about a crankshaft axis;
        a piston reciprocally positioned in the cylinder bore, the piston driving the crankshaft; and
        a lubrication system comprising:
            a lubricant cooler;
            a lubricant filter, and
            a lubricant pump unit comprising a lubricant pump;
    wherein the crankshaft axis does not intersect any portion of the lubricant pump.

2. The snowmobile of claim 1, wherein at least one of the lubricant cooler and the lubricant filter is generally transversely offset from the lubricant pump unit.

3. The snowmobile of claim 1, wherein the lubricant pump unit is positioned longitudinally between the crankshaft axis and a forward-facing side of the engine.

4. The snowmobile of claim 3, wherein the lubricant cooler is positioned adjacent the lubricant pump unit.

5. The snowmobile of claim 3, wherein the lubricant filter is positioned adjacent the lubricant pump unit.

6. The snowmobile of claim 5, wherein the lubricant cooler is positioned adjacent the lubricant filter.

7. The snowmobile of claim 1, wherein the lubricant pump unit further comprises:
    a main body portion having a first side, a first cover member associated with the first side of the main body portion, the main body portion and the first cover member positioned along the lubricant pump axis.

8. A snowmobile comprising:
    a frame assembly defining a longitudinal vertical plane and a transverse vertical plane;
    an internal combustion engine mounted generally along the transverse vertical plane of the frame assembly, the internal combustion engine comprising:
        a cylinder block defining a cylinder bore;
        a crankcase connected to the cylinder block defining a crankcase chamber, the crankcase having a crankshaft journaled therein, the crankshaft rotatable about a crankshaft axis;
        a piston reciprocally positioned in the cylinder bore, the piston driving the crankshaft; and
    a lubrication system comprising:
        a lubricant cooler;
        a lubricant filter, and
        a lubricant pump unit mounted in the crankcase chamber at a location offset from the crankshaft axis, the lubricant pump unit comprising a lubricant pump rotatable about a lubricant pump axis;
    wherein the lubrication system further comprises a shallow reservoir for collecting lubricant, the lubricant pump unit further comprises a lubricant strainer located in the first cover member, the lubricant pump unit mounted in the crankcase chamber such that the first cover member extends to a location proximate the shallow reservoir for drawing lubricant therefrom, and wherein at least one of the lubricant cooler and the lubricant filter is positioned on the same side of the engine as the lubricant pump unit.

9. The snowmobile of claim 8, wherein the lubricant pump unit further comprises a second cover member and a lubricant filter, the main body portion further comprises a second side, the second cover member associated with the second side.

10. The snowmobile of claim 9, wherein the lubricant strainer is provided in one of the first cover member and the second cover member.

11. The snowmobile of claim 10, wherein the lubricant strainer and the second cover member comprise a unitary construction.

12. The snowmobile of claim 9, wherein lubricant pump assembly further comprises a first mount boss.

13. The snowmobile of claim 12, wherein the first mount boss is located on one of the first cover member, the second cover member, and the main body portion.

14. The snowmobile of claim 13, wherein lubricant pump assembly further comprises a second mount boss.

15. The snowmobile of claim 14, wherein the second mount boss is located on one of the first cover member, the second cover member and the main body portion.

16. The snowmobile of claim 14, wherein the first mount boss is located on one of the first cover member, the second cover member, and the main body portion and the second mount boss is located one of the other of the first cover member, the second cover member, and the main body portion.

17. The snowmobile of claim 14, further comprising a relief valve located between the first mount boss and the second mount boss.

18. The snowmobile of claim 17, wherein the relief valve has a longitudinal axis, the relief valve oriented on the lubricant pump unit such that the relief valve longitudinal axis is generally parallel to the lubricant pump axis.

19. The snowmobile of claim 17, wherein the relief valve has a longitudinal axis, the relief valve oriented on the lubricant pump unit such that the relief valve longitudinal axis is generally perpendicular to the lubricant pump axis.

20. The snowmobile of claim 9, wherein the engine further comprises a breather inlet hole in fluid communication with an air induction system of the engine and in fluid communication with the crankcase, the lubricant pump unit further comprises a rib positioned such that when the lubricant pump unit is mounted in the engine, the rib at least partially shields the breather inlet hole from lubricant.

21. An internal combustion engine comprising:
a cylinder block defining a cylinder bore;
a crankcase connected to the cylinder block defining a crankcase chamber, the crankcase having a crankshaft journaled therein, the crankshaft rotatable about a crankshaft axis;
a piston reciprocally positioned in the cylinder bore, the piston driving the crankshaft; and
a lubrication system comprising:
a lubricant cooler;
a lubricant filter, and
a lubricant pump unit comprising a lubricant pump;
wherein the crankshaft axis does not intersect any portion of the lubricant pump.

22. The engine of claim 21, wherein at least one of the lubricant cooler and the lubricant filter is generally transversely offset from the lubricant pump unit.

23. The engine of claim 22, wherein the lubricant cooler is positioned adjacent the lubricant pump unit.

24. The engine of claim 22, wherein the lubricant filter is positioned adjacent the lubricant pump unit.

25. The engine of claim 21, wherein the lubricant pump unit further comprises:
a main body portion having a first side, a first cover member associated with the first side of the main body portion, the main body portion and the first cover member positioned along the lubricant pump axis.

26. An internal combustion engine comprising:
a cylinder block defining a cylinder bore;
a crankcase connected to the cylinder block defining a crankcase chamber, the crankcase having a crankshaft journaled therein, the crankshaft rotatable about a crankshaft axis;
a piston reciprocally positioned in the cylinder bore, the piston driving the crankshaft; and
a lubrication system comprising:
a lubricant cooler;
a lubricant filter, and
a lubricant pump unit mounted in the crankcase chamber at a location offset from the crankshaft axis, the lubricant pump unit comprising a lubricant pump rotatable about a lubricant pump axis;
wherein the lubrication system farther comprises a shallow reservoir for collecting lubricant the lubricant pump unit further comprises a lubricant strainer located in the first cover member, the lubricant pump unit mounted in the crankcase chamber such that the first cover member extends to a location proximate the shallow reservoir for drawing lubricant therefrom, and
wherein at least one of the lubricant cooler and the lubricant filter is positioned on the same side of the engine as the lubricant pump unit.

27. The engine of claim 26, wherein the lubricant pump unit further comprises a second cover member and a lubricant filter, the main body portion further comprises a second side, the second cover member associated with the second side.

28. The engine of claim 27, wherein the lubricant strainer is provided in one of the first cover member and the second cover member.

29. The engine of claim 28, wherein the lubricant strainer and the cover member in which the lubricant strainer is provided comprise a unitary construction.

30. The engine of claim 28, wherein lubricant pump assembly further comprises a first mount boss and a second mount boss, the first mount boss located on one of the first cover member, the second cover member, and the main body portion, the second mount boss located on one of the first cover member, the second cover member and the main body portion.

31. The engine of claim 30, further comprising a relief valve located between the first mount boss and the second mount boss, the relief valve defining a longitudinal axis, the relief valve oriented on the lubricant pump unit such that the relief valve longitudinal axis is generally parallel to the lubricant pump axis.

32. The engine of claim 30, further comprising a relief valve located between the first mount boss and the second mount boss, the relief valve defining a longitudinal axis, the relief valve oriented on the lubricant pump unit such that the relief valve longitudinal axis is generally perpendicular to the lubricant pump axis.

33. An internal combustion engine comprising:
- a cylinder block defining a cylinder bore;
- a crankcase connected to the cylinder block defining a crankcase chamber, the crankcase having a crankshaft journaled therein, the crankshaft rotatable about a crankshaft axis;
- a piston reciprocally positioned in the cylinder bore, the piston driving the crankshaft; and
- a lubrication system comprising:
  - a lubricant cooler;
  - a lubricant filter, and
  - a lubricant pump unit mounted in the crankcase chamber at a location offset from the crankshaft axis, the lubricant pump unit comprising a lubricant pump rotatable about a lubricant pump axis;
- an air induction system and a breather inlet hole communicating with the air induction system, the breather inlet hole also communicating with the crankcase, the lubricant pump unit further comprising a rib positioned such that when the lubricant pump unit is mounted in the crankcase, the rib at least partially shields the breather inlet hole from lubricant splattering in the engine;
- wherein at least one of the lubricant cooler and the lubricant filter is positioned on the same side of the engine as the lubricant pump unit.

* * * * *